(12) United States Patent
Weiss

(10) Patent No.: US 8,613,052 B2
(45) Date of Patent: Dec. 17, 2013

(54) APPARATUS, SYSTEM AND METHOD EMPLOYING A WIRELESS USER-DEVICE

(75) Inventor: Kenneth P. Weiss, Newton, MA (US)

(73) Assignee: Universal Secure Registry, LLC, Newton, MA (US)

( * ) Notice: Subject to any disclaimer, the term of this patent is extended or adjusted under 35 U.S.C. 154(b) by 0 days.

(21) Appl. No.: 13/234,874

(22) Filed: Sep. 16, 2011

(65) Prior Publication Data

US 2012/0240195 A1 Sep. 20, 2012

Related U.S. Application Data

(60) Provisional application No. 61/384,146, filed on Sep. 17, 2010, provisional application No. 61/447,497, filed on Feb. 28, 2011, provisional application No. 61/499,961, filed on Jun. 22, 2011.

(51) Int. Cl.
*H04L 29/06* (2006.01)
(52) U.S. Cl.
USPC .......................................................... 726/4
(58) Field of Classification Search
USPC .......................................................... 726/4
See application file for complete search history.

(56) References Cited

U.S. PATENT DOCUMENTS

| | | |
|---|---|---|
| 4,720,860 A | 1/1988 | Weiss |
| 4,856,062 A | 8/1989 | Weiss |
| 4,885,778 A | 12/1989 | Weiss |
| 4,998,279 A | 3/1991 | Weiss |
| 5,023,908 A | 6/1991 | Weiss |
| 5,058,161 A | 10/1991 | Weiss |
| 5,097,505 A | 3/1992 | Weiss |
| 5,168,520 A | 12/1992 | Weiss |
| 5,237,614 A | 8/1993 | Weiss |
| 5,361,062 A | 11/1994 | Weiss et al. |
| 5,367,572 A | 11/1994 | Weiss |
| 5,398,285 A | 3/1995 | Borgelt et al. |
| 5,457,747 A | 10/1995 | Drexler et al. |
| 5,479,512 A | 12/1995 | Weiss |
| 5,485,519 A | 1/1996 | Weiss |
| 5,657,388 A | 8/1997 | Weiss |
| 5,664,109 A | 9/1997 | Johnson et al. |

(Continued)

FOREIGN PATENT DOCUMENTS

| | | |
|---|---|---|
| EP | 0986209 A2 | 3/2000 |
| EP | 1081632 A1 | 3/2001 |

(Continued)

OTHER PUBLICATIONS

"FIPS PUB 46-3." Oct. 25, 1999. National Institute of Science and Technology (NIST). All pages.

(Continued)

*Primary Examiner* — Jason Gee
(74) *Attorney, Agent, or Firm* — Lando & Anastasi LLP

(57) ABSTRACT

Embodiments of the invention generally relate to apparatus, systems and methods for authentication, in particular, apparatus, systems and methods for authenticating an entity for computer and/or network security, secure authorization of a payment or for funds transfer and for selectively granting privileges and providing other services in response to such authentications. In addition, embodiments of the invention relate generally to apparatus, systems and methods for the communication of information between a mobile user-device and a point-of-sale device to securely provide authorization for a financial transaction.

46 Claims, 12 Drawing Sheets

(56) References Cited

U.S. PATENT DOCUMENTS

| | | | |
|---|---|---|---|
| 5,813,006 A | 9/1998 | Polnerow et al. |
| 5,870,723 A | 2/1999 | Pare, Jr. et al. |
| 5,915,023 A | 6/1999 | Bernstein |
| 5,971,272 A | 10/1999 | Hsiao |
| 6,073,106 A | 6/2000 | Rozen et al. |
| 6,088,450 A | 7/2000 | Davis et al. |
| 6,130,621 A | 10/2000 | Weiss |
| 6,202,055 B1 | 3/2001 | Houvener et al. |
| 6,253,202 B1 | 6/2001 | Gilmour |
| 6,253,203 B1 | 6/2001 | O'Flaherty et al. |
| 6,260,039 B1 | 7/2001 | Schneck et al. |
| 6,308,203 B1 | 10/2001 | Itabashi et al. |
| 6,309,342 B1 | 10/2001 | Blazey et al. |
| 6,393,421 B1 | 5/2002 | Paglin |
| 6,498,861 B1 | 12/2002 | Hamid et al. |
| 6,516,315 B1 | 2/2003 | Gupta |
| 6,546,005 B1 | 4/2003 | Berkley et al. |
| 6,581,059 B1 | 6/2003 | Barrett et al. |
| 6,640,211 B1 | 10/2003 | Holden |
| 6,658,400 B2 | 12/2003 | Perell et al. |
| 6,819,219 B1 | 11/2004 | Bolle et al. |
| 6,845,448 B1 | 1/2005 | Chaganti et al. |
| 6,941,271 B1 | 9/2005 | Soong |
| 6,950,521 B1 * | 9/2005 | Marcovici et al. ............ 380/249 |
| 7,007,298 B1 | 2/2006 | Shinzaki et al. |
| 7,237,117 B2 | 6/2007 | Weiss |
| 7,249,112 B2 | 7/2007 | Berardi et al. |
| 7,278,026 B2 | 10/2007 | McGowan |
| 7,412,604 B1 | 8/2008 | Doyle |
| 7,489,781 B2 | 2/2009 | Klassen et al. |
| 7,502,459 B1 | 3/2009 | Moseley |
| 7,548,981 B1 | 6/2009 | Taylor et al. |
| 7,571,139 B1 | 8/2009 | Giordano et al. |
| 7,657,639 B2 | 2/2010 | Hinton |
| 7,705,732 B2 | 4/2010 | Bishop et al. |
| 7,766,223 B1 | 8/2010 | Mello et al. |
| 7,805,372 B2 | 9/2010 | Weiss |
| 7,809,651 B2 | 10/2010 | Weiss |
| 8,001,055 B2 | 8/2011 | Weiss |
| 8,079,079 B2 | 12/2011 | Zhang et al. |
| 8,234,220 B2 | 7/2012 | Weiss |
| 2001/0032100 A1 | 10/2001 | Mahmud et al. |
| 2001/0044900 A1 | 11/2001 | Uchida |
| 2002/0046061 A1 | 4/2002 | Wright et al. |
| 2002/0090930 A1 | 7/2002 | Fujiwara et al. |
| 2002/0176610 A1 | 11/2002 | Okazaki et al. |
| 2002/0178364 A1 | 11/2002 | Weiss |
| 2002/0184538 A1 | 12/2002 | Sugimura et al. |
| 2003/0014372 A1 | 1/2003 | Wheeler et al. |
| 2003/0028481 A1 | 2/2003 | Flitcroft et al. |
| 2003/0046540 A1 | 3/2003 | Nakamura et al. |
| 2003/0084332 A1 | 5/2003 | Krasinski et al. |
| 2003/0085808 A1 * | 5/2003 | Goldberg ...................... 340/531 |
| 2003/0115490 A1 | 6/2003 | Russo et al. |
| 2003/0123713 A1 | 7/2003 | Geng |
| 2003/0129965 A1 | 7/2003 | Siegel |
| 2003/0163710 A1 | 8/2003 | Ortiz et al. |
| 2003/0226041 A1 | 12/2003 | Palmer et al. |
| 2003/0229637 A1 | 12/2003 | Baxter et al. |
| 2004/0017934 A1 | 1/2004 | Kocher |
| 2004/0034771 A1 | 2/2004 | Edgett et al. |
| 2004/0059923 A1 | 3/2004 | ShamRao |
| 2004/0111625 A1 | 6/2004 | Duffy et al. |
| 2004/0117215 A1 | 6/2004 | Marchosky |
| 2004/0117302 A1 | 6/2004 | Weichert et al. |
| 2004/0133787 A1 | 7/2004 | Doughty et al. |
| 2004/0151351 A1 | 8/2004 | Ito |
| 2004/0188519 A1 | 9/2004 | Cassone |
| 2004/0236699 A1 | 11/2004 | Beenau et al. |
| 2005/0001711 A1 | 1/2005 | Doughty et al. |
| 2005/0039027 A1 | 2/2005 | Shapiro |
| 2005/0113070 A1 * | 5/2005 | Okabe ........................ 455/411 |
| 2005/0187843 A1 | 8/2005 | Lapsley et al. |
| 2005/0187873 A1 | 8/2005 | Labrou et al. |
| 2005/0210270 A1 | 9/2005 | Rohatgi et al. |
| 2005/0235148 A1 | 10/2005 | Scheidt et al. |
| 2005/0238147 A1 * | 10/2005 | Carro ........................ 379/88.13 |
| 2005/0238208 A1 | 10/2005 | Sim |
| 2006/0000900 A1 | 1/2006 | Fernandes et al. |
| 2006/0016884 A1 | 1/2006 | Block et al. |
| 2006/0104486 A1 | 5/2006 | Le Saint et al. |
| 2006/0122939 A1 | 6/2006 | Cohen et al. |
| 2006/0165060 A1 | 7/2006 | Dua |
| 2006/0206724 A1 | 9/2006 | Schaufele et al. |
| 2006/0256961 A1 | 11/2006 | Brainard et al. |
| 2007/0005988 A1 | 1/2007 | Zhang et al. |
| 2007/0040017 A1 | 2/2007 | Kozlay |
| 2007/0079136 A1 | 4/2007 | Vishik et al. |
| 2007/0124597 A1 | 5/2007 | Bedingfield |
| 2007/0124697 A1 | 5/2007 | Dongelmans |
| 2007/0140145 A1 | 6/2007 | Kumar et al. |
| 2007/0186105 A1 | 8/2007 | Bailey et al. |
| 2007/0186115 A1 | 8/2007 | Gao et al. |
| 2007/0198436 A1 | 8/2007 | Weiss |
| 2007/0245152 A1 | 10/2007 | Pizano et al. |
| 2007/0256120 A1 * | 11/2007 | Shatzkamer et al. ............. 726/5 |
| 2008/0005576 A1 | 1/2008 | Weiss |
| 2008/0021997 A1 | 1/2008 | Hinton |
| 2008/0127311 A1 * | 5/2008 | Yasaki et al. ...................... 726/4 |
| 2008/0212848 A1 | 9/2008 | Doyle |
| 2008/0275819 A1 | 11/2008 | Rifai |
| 2009/0083544 A1 | 3/2009 | Scholnick et al. |
| 2009/0144814 A1 | 6/2009 | Sacco |
| 2009/0175507 A1 | 7/2009 | Schaffner |
| 2009/0203355 A1 | 8/2009 | Clark |
| 2009/0292641 A1 | 11/2009 | Weiss |
| 2010/0000455 A1 | 1/2010 | Harper |
| 2010/0046443 A1 | 2/2010 | Jia et al. |
| 2011/0258120 A1 | 10/2011 | Weiss |
| 2012/0130904 A1 | 5/2012 | Weiss |
| 2012/0240195 A1 | 9/2012 | Weiss |
| 2013/0024374 A1 | 1/2013 | Weiss |

FOREIGN PATENT DOCUMENTS

| | | | |
|---|---|---|---|
| GB | 2382006 A | 5/2003 |
| WO | 9207436 A1 | 4/1992 |
| WO | 9636934 A1 | 11/1996 |
| WO | 0214985 A2 | 2/2002 |
| WO | 2010000455 A1 | 1/2010 |
| WO | 2012037479 A1 | 3/2012 |

OTHER PUBLICATIONS

"Information Security: Challenges in Using Biometrics" Sep. 9, 2003. All pages. <http://www.gao.gov/new.items/d031137t.pdf>.

"PGP: An Introduction to Cryptography." 2000.

Hungtingon, G. "101 Things to Know About Single Sign On." 2006. Authentication World. All pages. <http://www.authenticationworld.com/Single-Sign-On-Authentication/101ThingsToKnowABoutSingleSignOn.pdf>.

International Search Report and Written Opinion for International Application No. PCT/US2011/051966 mailed Jan. 20, 2012.

International Search Report from PCT/US2007/004646 mailed Nov. 27, 2007.

International Search Report from PCT/US2007/070701 mailed Mar. 11, 2008.

International Search Report from PCT/US2009/035282 mailed Jul. 10, 2009.

Kessler, G., "An Overview of Cryptography," Aug. 22, 2002, all pages, retrieved via Wayback Machine on Jan. 19, 2010, http://www.garykessler.net/library/crypto.html.

Pabrai, U. "Biometrics for PC-User Authentication: A Primer" Feb. 1, 2001. Access Controls & Security Systems. All pages. <http://www.securitysolutions.com/mag/security_biometrics_pcuser_authentication/index.html>.

Treasury Broad of Canada Secretariat, PKI for Beginners Glossary, http://www.tbs-sct.gc.ca/pki-icp/beginners/glossary-eng.asp, Jul. 19, 2005.

"Single Sign on Authentication" Mar. 13, 2007. Authentication World. All pages. Retrieved Jul. 9, 2010 via Wayback Machine.

(56) References Cited

OTHER PUBLICATIONS

<http://web.archive.org/web/20070313200434/http://www.authenticationworld.com/Single-Sign-On-Authentication/>.

"Bluetooth Technology FAQ", Mobileinfo.com, Jan. 21, 2001, all pages, http://www.web.archive.org/web/200101211551/http://www.mobileinfocom/Bluetooth/FAQ.htm.

* cited by examiner

APPARATUS, SYSTEM AND METHOD EMPLOYING A WIRELESS USER-DEVICE

RELATED APPLICATIONS

This application claims priority under 35 U.S.C. §119(e) to each of the following co-pending U.S. Provisional Applications: Ser. No. 61/384,146, entitled "APPARATUS, SYSTEM AND METHOD FOR SECURE PAYMENT," filed on Sep. 17, 2010; U.S. Provisional Application Ser. No. 61/447, 497, entitled "APPARATUS, SYSTEM AND METHOD EMPLOYING A WIRELESS USER-DEVICE," filed on Feb. 28, 2011 and U.S. Provisional Application Ser. No. 61/499, 961, entitled "APPARATUS, SYSTEM AND METHOD FOR EMPLOYING A WIRELESS USER-DEVICE," filed on Jun. 22, 2011, each of which are incorporated herein by reference in their entirety.

BACKGROUND

1. Field of Invention

Embodiments of the invention generally relate to apparatus, systems and methods for identification, in particular, apparatus, systems and methods for identifying an entity for computer and/or network security, secure authorization of a payment or for funds transfer and for selectively granting privileges and providing other services in response to such identifications. In addition, embodiments of the invention relate generally to apparatus, systems and methods for the communication of information between a mobile user-device and a point-of-sale device to securely provide authorization for a financial transaction.

2. Discussion of Related Art

Millions of financial transactions are conducted daily using electronic systems. Many of these are conducted using traditional magnetic stripe readers while others are conducted using smart-cards, mobile phones or other handheld electronic devices. However, these prior approaches all require that an account number (bank account number, credit card account number, debit card account number, etc.) be provided to authorize the transaction. Because a thief with access to an account number poses a significant financial risk and risk of identity theft, financial service providers go to great efforts to try to communicate the account numbers securely when conducting these transactions.

In addition, electronic transactions often require that a user provide information that uniquely identifies the user to allow financial information or other personal information to be used in completing the transaction. This user-identification is generally static-information, that is, the information does not change over time, for example, user names and/or passwords. In addition, the user-identification information uniquely identifies the user. As a result of the well documented risk posed by identity theft, business entities spend enormous amounts of time, effort and money to protect this static user-identity information. The approaches implemented by business entities include using secure networks to transmit the user-identity information, and alternatively or in combination with the preceding, using various forms of encryption to protect the user-identity information from electronic-eavesdroppers. Regardless, each of these prior approach results in the transmission of the highly-sensitive user-identity information.

Further, traditional approaches to identity authentication rely on a verification process. That is, the authenticator receives static user-identity information along with other information such as a time (or event)-varying code. The authenticator employs the user-identity information to establish the user that the entity purports to be. The authenticator then employs the other information to determine whether that information authenticates that the entity is who they purport to be. Such approaches can include multi-factor authentication in which the entity provides the authenticator with information including evidence of one or more of something the user is (for example, a biometric), something the user knows (for example, a PIN); or something the user possesses (for example, a token). In this example, static information (for example, a user name or password) is used to verify the identity of the user to locate the other information (for example, any of biometric data, the user's PIN and/or a seed associated with the token) concerning the user which is stored by the authenticator. With a proprietary algorithm and the current time, the authenticator generates a non-predictable code using the other information that is associated with the user. The authenticator then determines whether the time-varying code received from the user is the same as that generated by the authenticator.

That is, some existing token technologies use a verification process that requires the user to supply a remote authentication system with a unique static index such as a user name or email address. This static information is used to retrieve the user's file, including a secret seed. With a proprietary algorithm and current time, that seed generates the expected unpredictable code. If the user sends the same code, the possession of the token is "VERIFIED." With today's powerful computers, it is possible to electronically eavesdrop or otherwise obtain a series of a particular user's codes at different times, and then reverse engineer the algorithm, and unique seed to counterfeit a token.

As mentioned above, however, the preceding approaches must begin with the entity providing the authenticator with the user-identity of the user that the entity purports to be. The security of these approaches can be breached because each requires the communication of the static identifying information. For example, today's powerful computers can be used by an electronic eavesdropper to reverse engineer the algorithm and the seed based on a series of intercepted time-varying codes generated for a particular user. Such an attack would then allow the eavesdropper to counterfeit the user's token.

Because of the previously described shortcomings of current approaches, improved identity-authentication is needed to provide sufficient security in view of the processing power of today's computers and the sophistication of today's eavesdroppers.

SUMMARY OF INVENTION

According to some embodiments, apparatus, systems and methods employ tokens that never send or transmit any abusable or exploitable static information. For example in one embodiment, an unpredictable number, representing the satisfaction of all three identity factors, is transmitted by radio frequency (RF) to a remote, secure server. In the background, the remote-server has been generating all non-predictable codes that are being generated on all or a group of authorized tokens. If the transmitted code is matched against the constantly changing database included in the remote server, the user is "IDENTIFIED."

According to various embodiments, identity-authentication is achieved without transmitting any exploitable static information. In one aspect, a system includes a processor configured to generate a non-predictable code using multiple authentication factors for a user in possession of a token. The system includes a secure authentication system (for example, including a database and associated server) that stores multiple authentication factors for a plurality of users, respectively. In one embodiment, the secure system periodically (for example, every minute) generates the non-predictable code associated with each of the plurality of users. When a non-predictable code alone without any static index is transmitted from a user token and received at the secure system, the system operates to compare the received code to all non-predictable codes valid at that time. When a match is found, the user is identified. This approach is in contrast to prior approaches in which the user's identity is "verified."

According to various embodiments, the token includes a mobile phone, a tablet or iPAD device or other wireless user-device and the token wirelessly transmits the non-predictable code.

Additional features can be included in combination with the preceding. For example, in some embodiments, a PIN is not stored in the token. Instead, according to this embodiment, the PIN is entered by the user and immediately integrated in an algorithm such that it is not stored, transmitted or otherwise exposed. According to one embodiment, the algorithm includes an exclusive-or operation performed on the PIN. Further, the non-predictable code is generated without being exposed to the user and is transmitted from the token via radio frequency (RF) so that it remains unknown to the user. These approaches increase security, speed and convenience.

For example, according to some embodiments, the generation and transmission of the non-predictable code in the preceding approach avoids constraints on the size of data that is transmitted from the token because the transmitted value is not manually entered by the user. In addition, the potentially large size of the non-predictable value (for example, 20 digits or more) can exponentially increase security while RF transmission dramatically increases speed and convenience.

According to some embodiments, the non-predictable value provides evidence of three factors including something the user is (for example, the biometric), something the user knows (for example, the PIN); and something the user possesses (for example, the token with the associated secret seed). Thus, in one embodiment, successful authentication of identity is only achieved where each of the three factors is valid for generation of a non-predictable value corresponding to the user.

The robustness of the system can be enhanced in some embodiments by addressing the unlikely circumstance where the same non-predictable code is generated for more than one user for a given time period. According to one embodiment, when the preceding occurs the secure system delays the authentication until the occurrence of immediately subsequent non-predictable code from the next time period to insure that the authentication proceeds based on a unique identification. In some embodiments, the current code and several future codes may be generated at either or both USR and the token for computational efficiency and instant comparisons. According to one embodiment, the codes are generated at USR on a substantially real-time basis.

To reduce the risk of a man-in-the-middle attack, embodiments can operate to have the secure system confirm its identity to the token. In one embodiment, the token generates and transmits a first non-predictable code (or portion thereof) to the secure system. This first non-predictable code is not used to execute the authentication used to approve the requested action. Instead, according to this embodiment, the secure system identifies the user based on the first non-predictable code (for example, using a code matching algorithm as described herein) and replies by generating a second non-predictable code (or portion thereof) that corresponds to the code that would be generated by the token during the immediately subsequent time period. The token receives the second non-predictable code and determines whether it is correct by comparing the code to that which it generates. If so, the remote secure system has proven its identity and the token then generates a third non-predictable value that is transmitted to the secure system where it is employed to authenticate the identity of the user.

According to some embodiments, the systems and methods described herein provide approaches in which the user device (for example, smart phone, tablet, or other form of token) do not store information that can be exploited by a hacker to impersonate the user. In one embodiment, the PIN entered by the user is not authenticated locally at the token. Instead, the PIN is either immediately employed in the generation of a non-predictable value used by a secure registry to authenticate an identity of the user or is transmitted in a protected manner to the secure registry as part of an authentication process, for example, by XORing the PIN with the non-predictable value. Because the PIN is not authenticated locally, the PIN need not be stored by the token. In one embodiment, the user device does not store information that can be exploited by a hacker to impersonate the user.

Unlike prior approaches in which a non-predictable value is encrypted (either in a consistent manner or a varying manner), embodiments described herein do not require encryption of the transmitted non-predictable value because the non-predictable value is transmitted without static identifying information. As a result, an eavesdropper gains no knowledge of the identity of the user even where the eavesdropper intercepts the non-predictable value.

In accordance with one aspect, a system for authenticating identities of a plurality of users includes a network having at least a portion that includes a wireless network, a computer coupled to the network, a handheld device configured to communicate with the computer over the wireless network and a secure registry system including a communication interface coupled to the network. In some embodiments, the handheld device includes a user interface programmed to receive user input including secret information known to the user of the handheld device. In addition, the handheld device can include a processor coupled to the user interface where the processor is programmed to authenticate the user of the handheld device and generate a time varying non-predictable value following a successful authentication of the user by the processor based on the user successfully providing the secret information to the handheld device. Further, the handheld can include a wireless transceiver coupled to the processor and configured to transmit via the network a wireless signal including the time-varying non-predictable value. According to further embodiments, the secure register system includes a communication interface coupled to the network where the secure registry system is configured to receive the time-varying non-predictable value and successfully authenticate the user where the time-varying non-predictable value is matched to the user by the secure registry system. Further, in accordance with some embodiments, a user of the handheld device is permitted to operate the computer to access resources with the computer so long as the computer periodically receives subsequent authentication information that results in a continued successful authentication of the user for time periods subsequent to a time at which the time-varying non-predictable value is generated.

In accordance with some embodiments the handheld device includes a biometric sensor coupled to the processor where the biometric sensor is programmed to receive a biometric input provided by the user and where the processor is programmed to authenticate the user of the handheld device and can generate a time varying non-predictable value following a successful authentication of the user by the processor. In one embodiment, the biometric sensor includes a microphone configured to receive a spoken input provided by the user and the user interface is programmed to display a multicharacter string including at least one of a plurality of alpha-characters and a plurality of numeric-characters, and further where the processor is programmed to authenticate the user based on the spoken input of the multi-character string by the user. In accordance with some embodiments, the secure registry system is programmed to randomly generate the multicharacter string and communicate the multicharacter string by the network to the handheld device for display.

In accordance with another aspect, a method of authenticating identity using a secure registry system is provided where the secure registry system includes a processor, a communication interface coupled to the processor and database coupled to the processor where the database is configured to store seed for each of the plurality of user respectively and the processor is configured to generate time-varying non-predictable values using the respective seeds. In accordance with some embodiments, the method includes receiving at the secure registry system a first time-varying non-predictable value generated by a first handheld device in possession of the user the first time-varying non-predictable value generated using a seed associated with the first handheld device and a first time. Further, the method can include identifying, by the secure registry, the user based on the first time-varying non-predictable value and generating a second time-varying non-predictable value with the secure registry. In one embodiment, the second time-varying non-predictable value is generated using the seed associated with the first handheld device and a second time where the second time is subsequent to the first time.

In addition, in accordance with some embodiments, the method may also include communicating at least a portion of the second time-varying non-predictable value to the first handheld device. In these embodiments, the second time-varying non-predictable value is employed by the first handheld device to communicate the identity of the secure registry system by confirming that the second time-varying non-predictable value is valid when generated using the seed at the second time. Further, the method may include authenticating an identity of the user by the secure registry system using the third time-varying non-predictable value generated by the first handheld device and received by the secure registry system. In accordance with these embodiments, the third time-varying non-predictable value is generated using the seed associated with the first handheld device and a third time subsequent to the second time.

In some embodiments, a method of securing a computing device can include receiving at the computing device a first wireless signal including first authentication information wirelessly transmitted from a mobile device proximate to the computing device, processing, the first authentication information to initially authenticate a user in possession of the mobile device, the user, attempting to access resources with a computing device. The method can also include temporarily allowing the user to employ the computing device to access the resources when the initial authentication is successful and continuing to allow the user to employ the computing device to access the resources upon a continued receipt of authentication information from a mobile device that is successfully authenticated. Still further, the method can include automatically terminating use of the computing device by the user based on at least one of: authentication information no longer being received from the mobile device and authentication information received from mobile device no longer being successfully authenticated.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
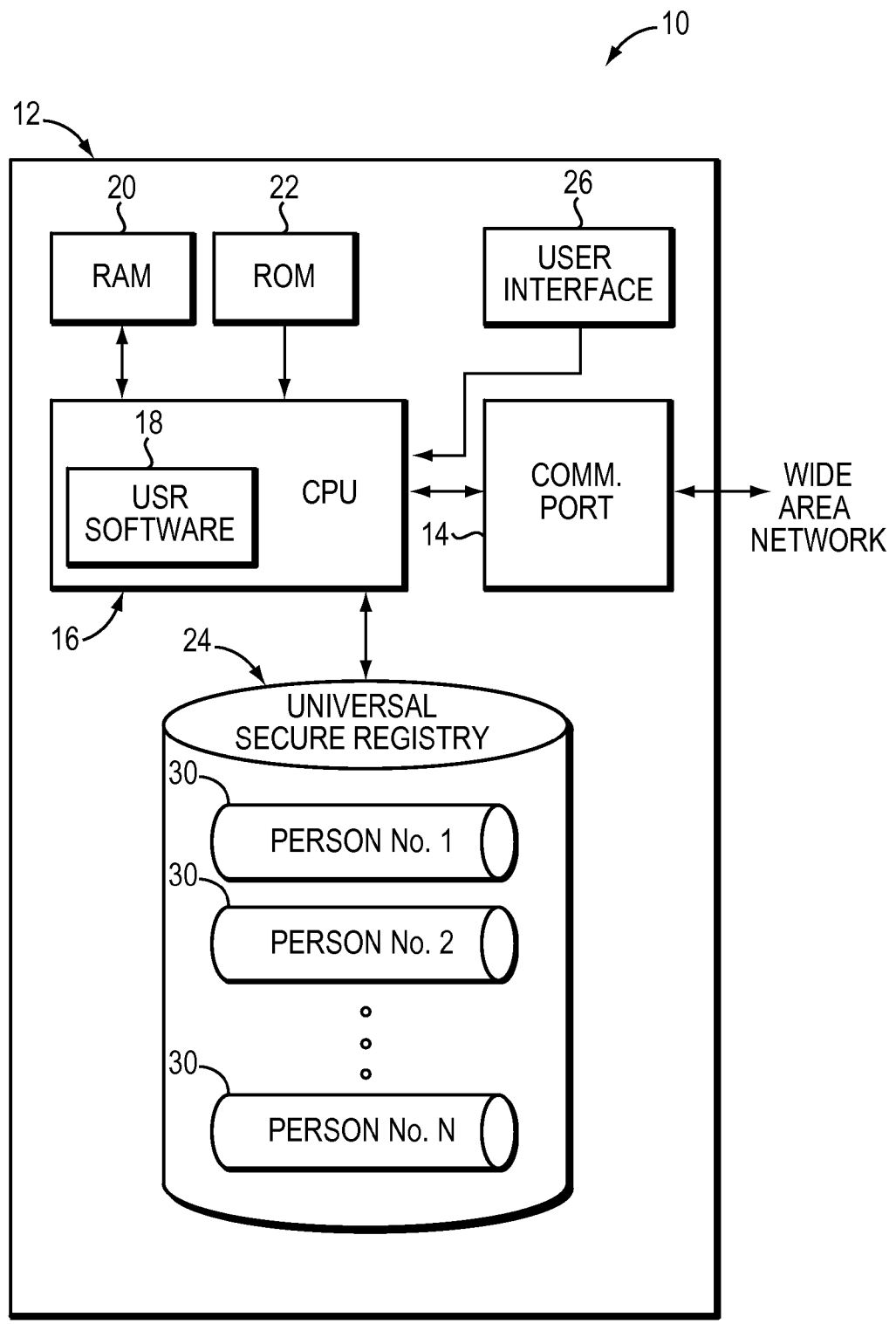
FIG. 1 is a functional block diagram of a computer system configured to implement the universal secure registry ("USR"), including a USR database, according to one embodiment of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

As used herein, "USR" generally refers to a secure registry, for example, a remote secure registry. In some embodiments, USR is employed as a secure, central repository for a variety of confidential personal information. In various embodiments, this personal information can be used to authenticate an identity in support of any of the following activities: Credit/Debit Card Purchases; Check Purchases; Wiring Funds; Accessing bank and other financial records; transferring funds between individuals; transferring funds between an individual and vendor and vending machine; providing a form of identification; unlocking and starting a vehicle; unlocking and entering a home, office, hotel room or other secure physical space; accessing secure physical facilities such as a military base or nuclear reactor; completing applications for loans, mortgages, credit or jobs; accessing and/or logging into a computer, a computer network or a secure server; and completing medical (or other types of) forms.

In some embodiments, an information system is formed as a computer program running on a computer or group of computers configured to provide a universal secure registry (USR) system. The computer, in this instance, may be configured to run autonomously (without the intervention of a human operator), or may require intervention or approval for all, a selected subset, or particular classes of transactions. The invention is not limited to the disclosed embodiments, and may take on many different forms depending on the particular requirements of the information system, the type of information being exchanged, and the type of computer equipment employed. An information system according to this invention, may optionally, but need not necessarily, perform functions additional to those described herein, and the invention is not limited to a computer system performing solely the described functions.

In the embodiment shown in FIG. 1, a computer system 10 for implementing a USR system according to the invention includes at least one main unit 12 connected to a wide area network, such as the Internet, via a communications port 14. The main unit 12 may include one or more processors (CPU 16) running USR software 18 configured to implement the USR system functionality discussed in greater detail below. The CPU 16 may be connected to a memory system including one or more memory devices, such as a random access memory system RAM 20, a read only memory system ROM 22, and one or more databases 24. In the illustrated embodiment, the database 24 contains a universal secure registry database. The invention is not limited to this particular manner of storing the USR database. Rather, the USR database may be included in any aspect of the memory system, such as in RAM 20, ROM 22 or disc, and may also be separately stored on one or more dedicated data servers. According to some embodiments, cloud computing is employed such that access to the USR and associated features and elements is remotely available to users and/or administrators.

The computer system may be a general purpose computer system which is programmable using a computer programming language, such as C, C++, Java, or other language, such as a scripting language or even assembly language. The computer system may also be specially programmed, special purpose hardware, an application specific integrated circuit (ASIC) or a hybrid system including both special purpose components and programmed general purpose components.

In a general purpose computer system, the processor is typically a commercially available microprocessor, such as Pentium series processor available from Intel, or other similar commercially available device. Such a microprocessor executes a program called an operating system, such as UNIX, Linux, Windows NT, Windows 95, 98, or 2000, or any other commercially available operating system, which controls the execution of other computer programs and provides scheduling, debugging, input/output control, accounting, compilation, storage assignment, data management, memory management, communication control and related services, and many other functions. The processor and operating system defines a computer platform for which application programs in high-level programming languages are written.

The database 24 may be any kind of database, including a relational database, object-oriented database, unstructured database, or other database. Example relational databases include Oracle 81 from Oracle Corporation of Redwood City, Calif.; Informix Dynamic Server from Informix Software, Inc. of Menlo Park, Calif.; DB2 from International Business Machines of Armonk, N.Y.; and Access from Microsoft Corporation of Redmond, Wash. An example object-oriented database is ObjectStore from Object Design of Burlington, Mass. An example of an unstructured database is Notes from the Lotus Corporation, of Cambridge, Mass. A database also may be constructed using a flat file system, for example by using files with character-delimited fields, such as in early versions of dBASE, now known as Visual dBASE from Inprise Corp. of Scotts Valley, Calif., formerly Borland International Corp.

The main unit 12 may optionally include or be connected to an user interface 26 containing, for example, one or more input and output devices to enable an operator to interface with the USR system 10. Illustrative input devices include a keyboard, keypad, track ball, mouse, pen and tablet, communication device, and data input devices such as voice and other audio and video capture devices. Illustrative output devices include cathode ray tube (CRT) displays, liquid crystal displays (LCD) and other video output devices, printers, communication devices such as modems, storage devices such as a disk or tape, and audio or video output devices. Optionally, the user interface 26 may be omitted, in which case the operator may communicate with the USR system 10 in a networked fashion via the communication port 14. It should be understood that the invention is not limited to any particular manner of interfacing an operator with the USR system.

It also should be understood that the invention is not limited to a particular computer platform, particular processor, or particular high-level programming language. Additionally, the computer system may be a multiprocessor computer system or may include multiple computers connected over a computer network. It further should be understood that each module or step shown in the accompanying figures and the substeps or subparts shown in the remaining figures may correspond to separate modules of a computer program, or may be separate computer programs. Such modules may be operable on separate computers. The data produced by these components may be stored in a memory system or transmitted between computer systems.

Such a system may be implemented in software, hardware, or firmware, or any combination thereof. The various elements of the information system disclosed herein, either individually or in combination, may be implemented as a computer program product, such as USR software 18, tangibly embodied in a machine-readable storage device for execution by the computer processor 16. Various steps of the process may be performed by the computer processor 16 executing the program 18 tangibly embodied on a computer-readable medium to perform functions by operating on input and generating output. Computer programming languages suitable for implementing such a system include procedural programming languages, object-oriented programming languages, and combinations of the two.

Figure 2:
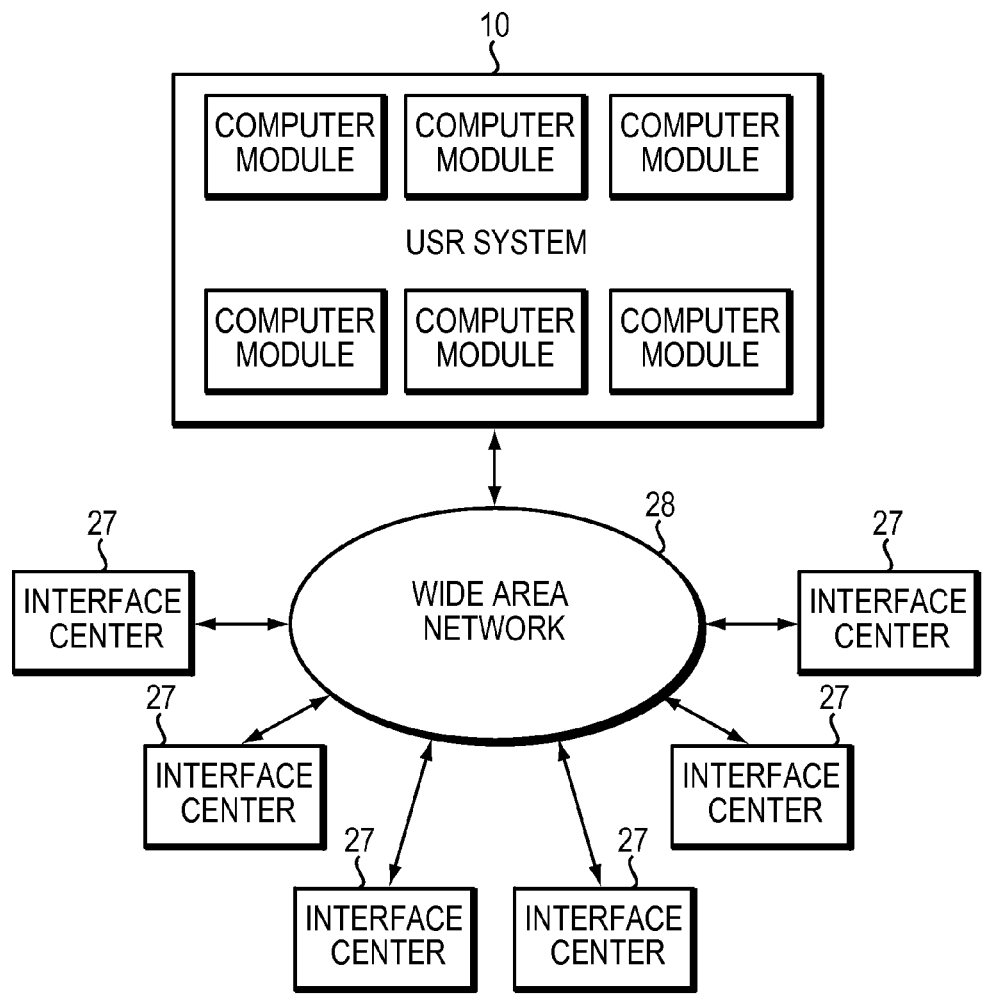
FIG. 2 is a functional block diagram of a first embodiment of a networked environment including the computer system of FIG. 1.

As shown in FIG. 2, the computer system 10 may be connected to a plurality of interface centers 27 over a wide area network 28. The wide area network 28 may be formed from a plurality of dedicated connections between the interface centers 27 and the computer system 10, or may take place, in whole or in part, over a public network such as the Internet. Communication between the interface centers 27 and the computer system 10 may take place according to any protocol, such as TCP/IP, ftp, OFX, or XML, and may include any desired level of interaction between the interface centers 27 and the computer system 10. To enhance security, especially where communication takes place over a publicly accessible network such as the Internet, communications facilitating or relating to transmission of data from/to the USR database 24 or the computer system 10 may be encrypted using an encryption algorithm, such as PGP, DES, or other conventional symmetric or asymmetric encryption algorithm.

In one embodiment, the USR system 10 or USR database 24 may be able to authenticate its identity to a user or other entity accessing the system by providing an appropriate code which may be displayed on the user's smart card, mobile device such as a mobile phone, ipad, tablet, laptop, netbook, or on a desktop computer as some examples. A comparison by the user or the code generator between the provided number and an expected number can validate, to the user (or other entity) or a code generator included in the user-device, that communication is with the database and not an imposter. In another embodiment, a challenge-response protocol is employed to authenticate the identity of the USR system and/or the user to the other.

The database 24 shown in FIG. 1 has a USR database containing entries related to persons 1-n. The data in the USR database may also be segregated, according to data type to enable individual computer modules to handle discrete applications on discrete data types. Segregating the data in modules may make access to the database more robust by enabling portions of the data in the USR database 24 to be accessible even when it is necessary to perform maintenance on a portion of the database. However, storing the data in the USR database 24 according to the scheme illustrated in FIG. 1 may make it easier for a user of the database to make changes to multiple types of data simultaneously or in a single session. There are advantages and disadvantages to each data structure, and the invention is not limited to a particular manner of organizing the data within the database 24, data structures other than the two shown also being possible.

Figure 3:
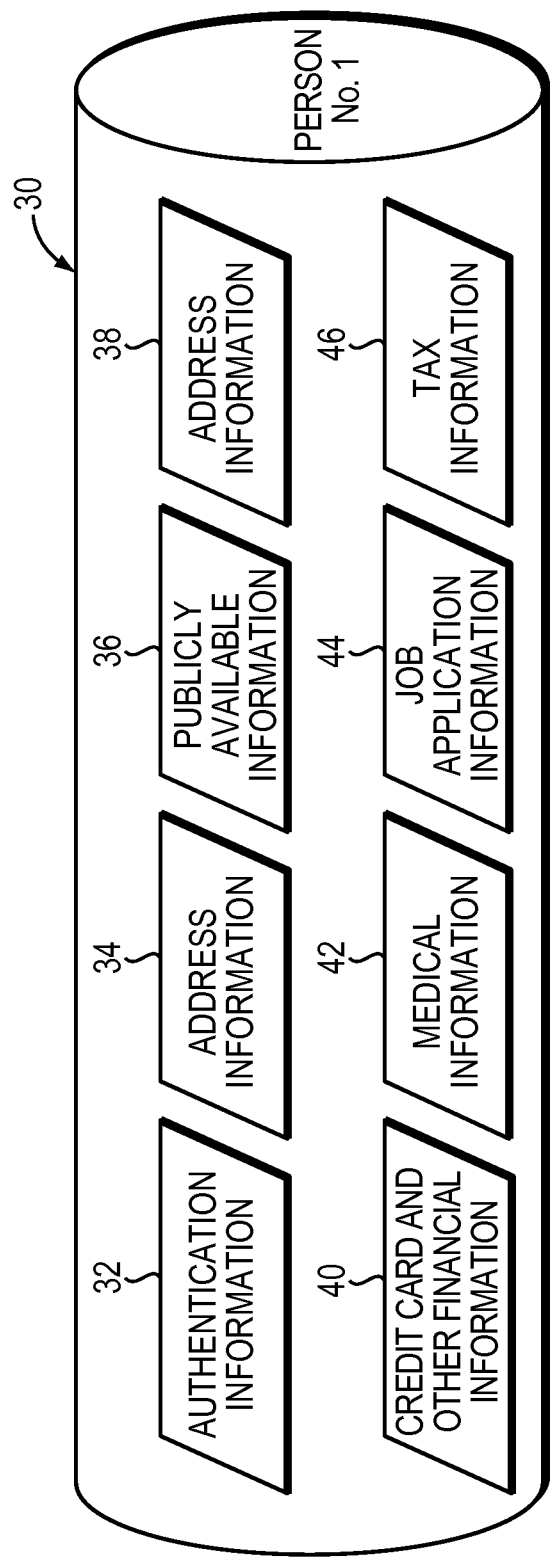
FIG. 3 is a functional block diagram of an entry of a database forming the USR database of FIG. 1 in accordance with one embodiment.

As shown in FIG. 3, each entry 30 in the database 24 may contain multiple types of information. For example, in the embodiment shown in FIG. 3, the entry contains authentication information 32, access information 34, publicly available information 36, address information 38, credit card and other financial information 40, medical information 42, job application information 44, and tax information 46. The invention is not limited to a USR containing entries with all of this information or only this particular information, as any information on a person or other entity such as a company, institution, etc. may be stored in USR database 24.

If the database information is split between multiple databases, each database will typically include at least the authentication and access information to enable the USR software to correlate an authentication attempt with a valid authentication, and to enable the USR software to determine access privileges to the requested data. Alternatively, databases may be linked to permit information not in a main USR database to be retrieved, with successful authentication for all databases accessed being done at the USR system.

In FIG. 3, the authentication information is information about the user of the database to whom the data pertains and is to be used by the USR software 18 to validate that the person attempting to access the information is the person to whom the data pertains or is otherwise authorized to receive it. The authentication information may be any type of information that will reliably authenticate the identity of the individual. For example, in some embodiments, the information may include any of a secret known by the user (e.g., a pin, a phrase, a password, etc.), a token possessed by the user that is difficult to counterfeit (e.g., a secure discrete microchip), and/or a biometric information concerning a biometric, for example, a voiceprint, a fingerprint, DNA, a retinal image, a photograph, etc.

The user's authentication information may be manually entered or scanned at the interface center. However, a variety of types of communication may be employed to communicate the user's identifying information from the user-device to the computer system. For example, near field signal may be employed to communicate information between the user-device and the computer system 10. According to one embodiment, the user's authentication information is included in (or entered via) the user's cell phone where it is then communicated to the computer system 10. In one embodiment, the cell phone is also configured to receive information from the computer system 10 at the interface center 27.

In one embodiment, the user of the database will carry a user-device that allows for secure access to the USR database without requiring the user to transmit any personal information. In one embodiment, to access the USR database, the user-device retrieves a secret seed associated with the device and/or time varying value from memory and obtains from the user a secret personal identification code. The user-device mathematically combines these three numbers using a predetermined algorithm to generate a one-time non-predictable code which is transmitted to the computer system 10. The computer system, specifically USR software 18, utilizes the received one-time non-predictable code to determine whether the user is authorized access the USR database and grants access to the USR database if the user is determined to be authorized. The authentication information 32 in the database entry in the embodiment of the invention illustrated in FIG. 3 contains information to enable the USR software 18 to validate the user using such a card in this manner.

Alternative types of identification cards or tokens may likewise be used. For example, other smart cards may be used which generate non-predictable single use codes, which may or may not be time varying, or other access code generators may be used. An algorithm generating such non-predictable codes may also be programmed onto a processor on user-devices such as smart cards or other computing devices, such as a cell phone, pager, ID badge, wrist watch, computer (for example, desktop, laptop, netbook, tablet), personal digital assistant, key fob, or other commonly available electronic device. For convenience, the term "electronic ID device" will be used generically to refer to any type of electronic device that may be used to obtain access to the USR database.

Likewise, various types of biometric information may be stored in the authentication area of the database entry to enable the identity of the user possessing the identifying device to be authenticated at the point of use. Examples of the type of biometric information that may be used in this situation includes a personal identification number (PIN), fingerprint, voice print, signature, iris or facial scan, or DNA analysis. If desired, the verifying section of the database may contain a picture to be transmitted back to the person seeking to validate the device to ensure the person using the device is the correct person. Optionally, the identifying device itself may also be provided with a picture of the person authorized to use the card to provide a facial confirmation of the person's right to use the card.

Further, a challenge-response protocol may be employed in combination with or as an alternative to the preceding to validate the person attempting to access the information. Various embodiments may employ a challenge-response protocol with or without an identification card.

In FIG. 3, the Access information 34 is provided to enable different levels of security to attach to different types of information stored in the entry 30 in the USR database 14. For example, the person may desire that their address information be made available only to certain classes of people, for example colleagues, friends, family, Federal Express, U.P.S., and the U.S. mail service. The names or universal identifiers for those selected individuals, companies, organizations and/or agencies may be entered into appropriate fields in the Access information to specify to the USR software 18 those individuals to whom the address information may be released. Likewise, access fields may be specified for the other types of information. For example, the individual may specify that only particular individuals and/or companies have access to the credit card and other financial information 40, medical information 42, job application information 44 and tax information 46. Additionally, the individual may specify that no one have access to that information unless the individual participates in the transaction (see FIG. 6).

As shown in FIG. 1, the USR software 18 contains algorithms for execution by the CPU 16 that enables the CPU 16 to perform the methods and functions of the USR software described herein. The USR software 18, in this embodiment, performs all functions associated with validating an electronic ID card. If desired, a separate authentication software module may be provided to validate electronic ID devices outside of a firewall segregating the authentication information from other user information.

This algorithm comprising the USR software 18 may be used to implement, in one exemplary embodiment, a USR system configured to enable selected information to be disseminated to selected individuals in a secure and dynamic fashion. This information may be used for numerous purposes, several of which are set forth below and discussed in greater detail below.

For example, the USR system may be used to identify the person, enable the person to be contacted by telephone or mail anonymously, enable the person to be contacted by telephone or by mail without revealing the person's telephone number or present location, enable the person to purchase items over the Internet or in a store without revealing to the merchant any personal identification information or credit card information, enable the person to complete a job application without completing a job application form, enable the police to discern the person's identity and any outstanding warrants on the individual, and numerous other uses. The invention is not limited to these several enumerated uses, but rather extends to any use of the USR database.

Figure 4:
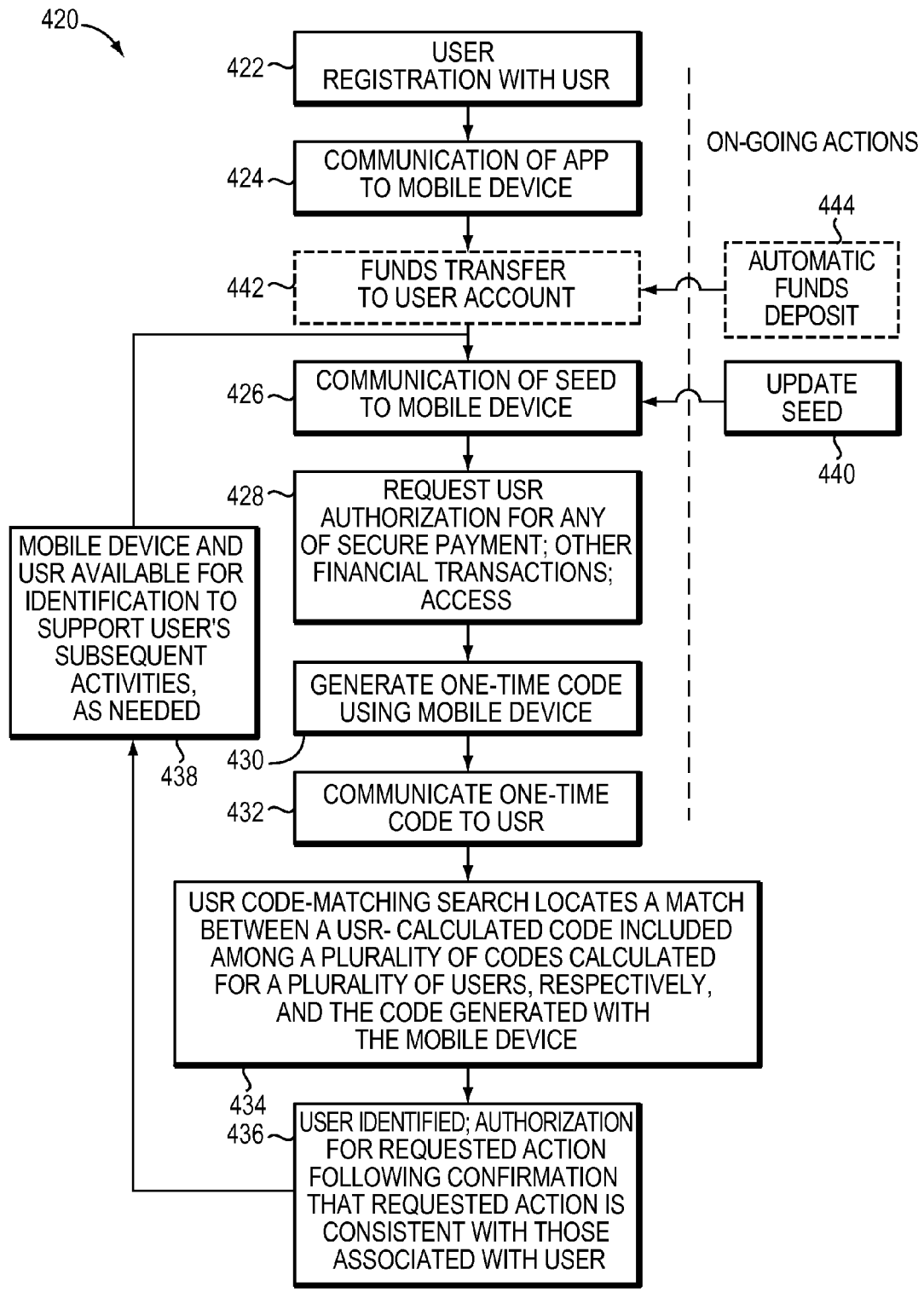
FIG. 4 is a flow chart in accordance with one embodiment.

FIG. 4 illustrates a flow chart of a process 420 for identification of an entity employing the USR. In the illustrated embodiment, the process 420 begins at act 422 where a user registers with the USR. In various embodiments, the registration process can be accomplished remotely over any one of or any combination of wide area networks, local area networks including GSM, Bluetooth, near field communication and Wi-Fi, as some examples. The registration process can include the communication of the user's image, for example, a digital photograph of the user's face that is stored at the USR for use in authenticating the identity of the user in various situations. Further, in various embodiments, the process can require that the user's image be periodically updated to make sure that the image remains current. Other biometric information can also be provided by the user during the registration process, for example, the user can speak the numbers 0-9 for later use in activation of a mobile device as described further herein. This information can be stored with the authentication information 32 as illustrated in FIG. 3.

At act 424, an application, for example, a software application is communicated from the USR to the user's mobile device when the registration is complete. The application can include any of a variety of software programs configured to operate on the user's mobile device, for example, applications programmed for, or using, any of the Java® Platform, Micro Edition (ME), the Android® platform, Linux®, .NET Compact Framework, BREW (Binary Runtime Environment for Wireless), the Symbian platform, the Qt framework, Windows Mobile®, Palm® OS, as well as applications developed for proprietary operating systems such as Blackberry® by Research In Motion of Waterloo, Ontario, Canada, and iOS by Apple Inc. of Cupertino, Calif.

At act 426, a digital seed which may be encrypted is communicated from the USR to the user's mobile device. In general, the seed is employed to generate a random number, for example, a time varying random number that can be used to identify the user. In some embodiments, the seed is combined with an electronic serial number (ESN) of the token and a digital representation of the time interval. Thus, in accordance with some embodiments, the seed itself is generated in a random fashion at the USR and then stored such that it is associated with the user and can later be used to derive random or pseudo-random one-time codes that are generated at the user device and also at the USR, as is explained further herein.

In accordance with some embodiments, the seed is generated in a random, relatively non-deterministic fashion by the USR using one or a combination of the following non-limiting examples: a real time clock; a counter included in the USR that measures an unstable property of an element (for example, the settling time of an unstable phased locked loop circuit) or the characteristics of a random external event; an analog signal (for example, a voltage produced by noise or data) which is generated by or received by the USR; a random number generator or cryptofunction included in the USR (for example, a multi-stage random number generator; an xorshift random number generator; a linear congruential generator algorithm), the elapsed time of an external function (for example, a wireless message transfer time), or a random number generator provided by an application programming interface (API) included in the USR.

Communication of the seed can be completed over any of a wide area network or a local area network or a combination of both wide area networks and local area networks. For example, the seed can be communicated through a cellular network to a mobile device such as a smart phone. In accordance with other embodiments, the seed can be communicated to the mobile device via a wide area network such as the Internet to a user's personal computer from which it can be communicated to the mobile device via a hardwire USB connection or any manner of wireless connections such as Bluetooth communication. According to one embodiment, the seed is communicated to the mobile device along with the application. In addition, the seed can thereafter be updated as described below.

In accordance with some embodiments, for example, where USR is employed in a system for proximity-based computer security using a wireless user-device (for example, as described in association with FIG. 12) the computer can have a USR element that includes a seed associated with each user authorized to unlock the computer to access resources. In these embodiments, updates to the seed or seeds included in the USR element at the computers can be updated as described above to maintain current information in the computer for the user(s).

At act 428, the user requests authorization from the USR for any of a secure payment, authorization for other types of financial transactions, authorization for access to a secure network or physical space, or authorization for any of the activities described previously for which the USR can be employed to authorize the user's action to a third party. That is, once the mobile device is provided with the application and the seed is communicated to the mobile device, the user has the elements in place with which they can employ the process 420 as generally shown in FIG. 4 to identify themselves in a secure manner to a USR. Accordingly, in some embodiments, the process 420 ends at act 426 for user registration and system activation. Thereafter, the process 420 later begins at act 428, when the user requests authorization to take one or a plurality of the listed actions.

Beginning at act 430, the process 420 illustrates a general approach employing the USR to identify the user to authorize an action requested by the user either directly by the user or via an intermediary, for example, a third party conducting a transaction with the user. At act 430, the user employs the mobile device to generate a one-time code, for example, a one-time non-predictable pseudo random code. According to one embodiment, the random code is generated by employing a combination of time and the seed that was previously assigned to the user and communicated to the mobile device. In some embodiments, the ESN is employed with the preceding. As described further herein, embodiments can allow the time to be substantially synchronized between the USR and the mobile device to provide a highly secure manner of identifying the user. Further, the seed that is assigned by the USR is stored and maintained by the USR such that the USR has all the information required by which it can generate the random one-time code that corresponds to the random one-time code generated using the mobile device.

In accordance to some embodiments, the USR maintains a database for a plurality of user's where the database includes a random seed that is unique to each user where the seeds are assigned by the USR server. As used herein, the term unique indicates that there is no probability that the USR will assign an identical seed (that is, a seed having an identical value) to more than one user for example, pseudo-random seed generation with the result compared to all previously generated seeds and rejected if there is a match.

According to various embodiments, the random one-time code is a discrete value that is generated by an algorithm that employs a combination of the seed assigned to the user via the USR and at least one of time (for example, Coordinated Universal Time), an electronic serial number of the mobile device, a SIM card number of the SIM card included in the device and a PIN number provided by the user. According to some embodiments, any of the seed, the electronic serial number, the SIM card number and the PIN can be stored in a secure element provided with the mobile device. In various embodiments, the secure element can include a microcontroller, memory or other electronic components that can be provided in the mobile device. Further, in various embodiments, the random one-time code is generated by employing a PIN in combination with any one of or any combination of an electronic serial number of the user-device, a SIM number of the user-device and a seed associated with the device.

In accordance with one embodiment, at act 434, the USR employs a code-matching algorithm to locate a match between the random one-time code communicated from the mobile device and the random one-time codes that are calculated for each of a plurality of registered users as provided by the USR. That is, because the USR can host tens of millions or more registered users, the USR is programmed to conduct code-matching searches by first determining a current code associated with each user and then comparing the random one-time code received from the user by the mobile device with all the codes calculated for that moment in-time by the USR. At act 436, the user is identified if a match is found. The USR then reviews the authorization request to determine whether the identified-user has the permission required to take the requested action, i.e., the USR determines whether the requested action is consistent with those associated with the user.

According to some embodiments, registered users are organized into groups, for example, based on the geography, to reduce the plurality of users that are processed with the code-matching algorithm on receipt of a random one-time code. In one embodiment, location information can be transmitted with the random one-time code from a user's mobile device.

According to some embodiments, the approach illustrated in FIG. 4 can be employed over periods of time for a variety of authorized activities requested by the user. Thus, at act 438, the mobile device and the USR are available for identification to support the user's subsequent activities as needed. In accordance with the illustrated embodiment, the process begins again for a subsequent act at act 426, however, in some embodiments, the process can begin at act 428. Where, for example, the same seed is to be employed in the subsequent authorization request made relatively close in time to the first request.

FIG. 4 also illustrates an embodiment in which there are a plurality of ongoing actions that can take place in the process 420. For example, at act 440, an updated seed is assigned to the user by the USR and communicated to the mobile device. The preceding can be conducted at a known interval (i.e., periodically) or in a more random nature that is sufficient to maintain the level of security required of the process 420. Thus, in various embodiments, the updated seed can be provided at act 440 on the frequency of less than one minute, between one and fifteen minutes, hourly, daily, weekly, or at some other interval that is either a known frequency or a variable frequency. In some embodiments, the interval can be established to achieve a desired level of security, for example, where the more frequently the seed is updated the greater the security.

As also illustrated in FIG. 4, according to some embodiments, the process 420 can be used to assist a user in making payments and/or fund transfers from the user's account which is maintained with the USR. As is described in greater detail herein, such an approach can provide the user with a means by which the mobile device can be employed to transfer funds between their account and the account of another authorized user after the parties have agreed to the transfer and after the USR has been employed to identify the parties to the transaction. In addition, the USR can be employed to maintain the accounts such that the transfer of funds occurs within the USR from an account of a USR-account of the payer to a USR-account of the payee.

According to one embodiment, the user can establish a fund's transfer account with the USR during the act of registration 422 or sometime thereafter. In the illustrated embodiment, the user establishes the funds-transfer account at Act 442. Further, the user can activate the account by transferring funds to the USR, for example, such as electronically transferring the funds, wiring the funds, charging the funds to an account or mailing a check to the USR administrators. Once populated with funds, the account can be employed to make or receive payments or otherwise transfer funds between their accounts and the accounts of other authorized, registered USR users.

In some embodiments, authorized users (that is, payors or payees) are established on temporary, real-time basis to conduct a one-time transaction. In further embodiments, registered USR users are authorized by a payor for an anticipated series of transactions over a longer period of time in the future.

Further, one of the ongoing actions illustrated in 420 includes the act 444 at which automatic replenishment of funds can be applied to the user's account. Such an approach can rely on preauthorized transfers or debits from the user's existing bank accounts or other forms of electronic transfer funds such as a transfer of funds from a credit card or debit account. The acts 442 and 444 are illustrated in phantom because they are optional in accordance with some embodiments.

Figure 5:
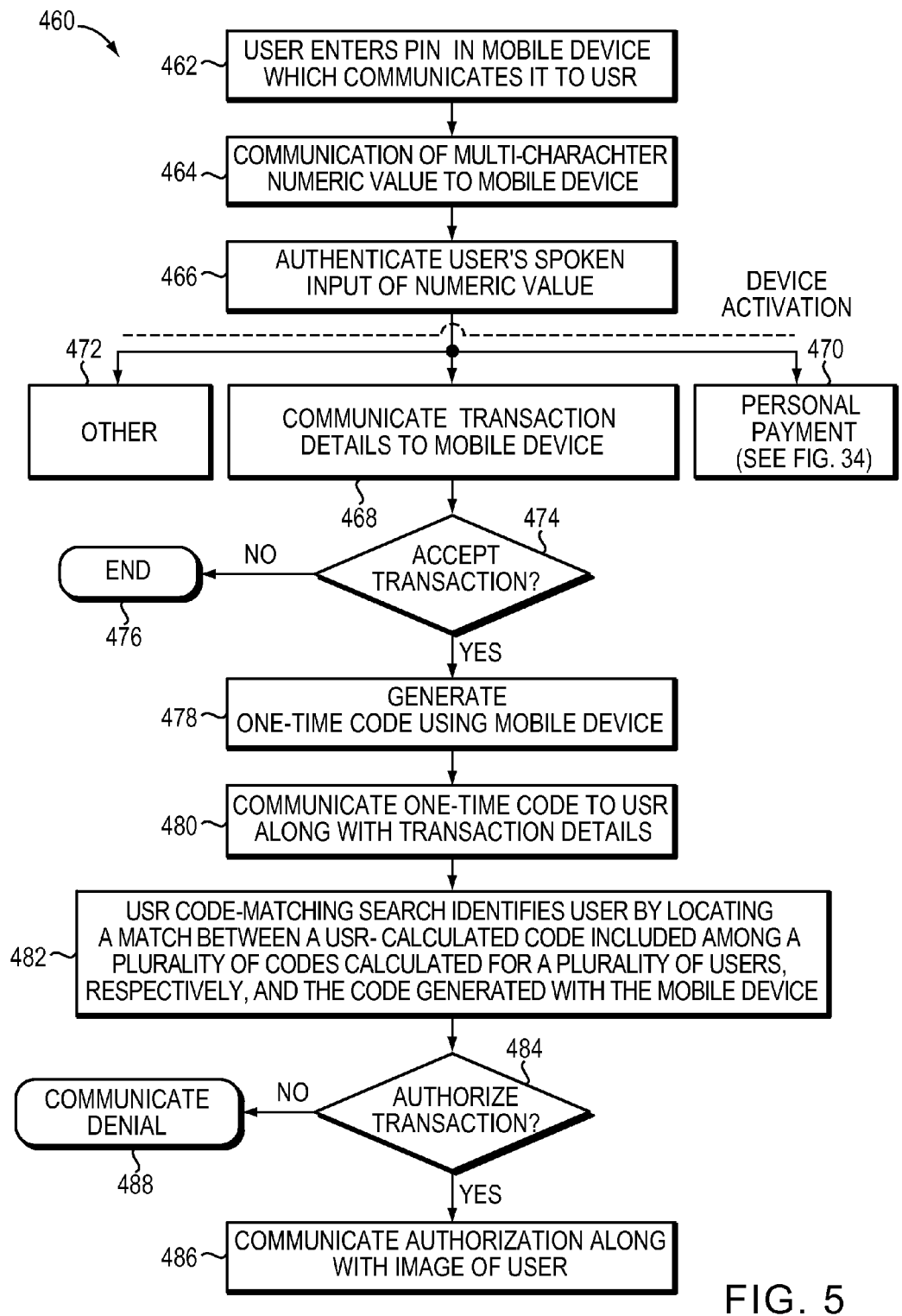
FIG. 5 is a flow chart in accordance with another embodiment.

Referring now to FIG. 5, a process 460 is illustrated by which a user can employ a mobile device to receive an authorization for one or more of the user's activities. Some embodiments include a process by which a user activates a mobile device for use in having their identification confirmed. According to one embodiment, the process 460 includes act 462 in which a user enters a PIN number in their mobile device and at Act 464, the PIN number is communicated to the USR, for example, in an encrypted form. According to some embodiments, at Act 466, the USR compares the PIN to PINs associated with a plurality of users all stored at the USR, and where the PIN matches the identity of a user, communicates the multi-character numeric value to the user's mobile device. According to this embodiment, the user's spoken input of the numeric value is employed to authenticate the user to activate the mobile device for use in an identification process with the USR. Thus, in accordance with one embodiment, the user's spoken input is communicated to the USR for authentication in order to activate the mobile device. According to another embodiment, at Act 466, the authentication of the user's spoken input is accomplished at the mobile device. In other embodiments, the mobile device can have limited functionality (for example, allowing a user to make phone calls or browse the Internet) prior to device activation while preventing the mobile device from being employed to execute secure transactions or take other actions that require interaction with USR based-authentication until a device activation process is complete (for example, acts 462, 464 and 466 of the process 460).

In some embodiments, entry of a PIN is not required. Instead, a selection of the USR application results in the multi-character value being presented to the user in a display of their mobile device. The user's spoken input of the multi-character value is then authenticated at act 466.

According to various embodiments, the device activation portion of the process 460 (the acts 462, 464, and 466) can differ from that described above, for example, the PIN may be used to derive a non-predictable value that is used to identify the user prior to communication of the multi-character numeric value. In still further embodiments, the process 460 does not include the acts 462, 464 and 466.

Although the process 460 is described a employing a multi-character numeric value, other embodiments can employ a multi-character string that includes either or both alpha or numeric characters. In some embodiments, the user interface of the mobile device (for example, the wireless user device 652, 735) is configured to display a multi-character string including at least one of a plurality of alpha-characters and a plurality of numeric-characters where a processor included in the mobile device is programmed to authenticate the user based on the spoken input of the multi-character string by the user. In a further embodiment, the processor included in the mobile device is programmed to authenticate the spoken input on a character-by-character basis.

According to various embodiments, the device activation portion of the process 460 (the acts 462, 464, and 466) can be employed by a user to allow their identity to be confirmed and their actions authorized in any of a wide variety of environments and situations. For example, at act 468, the activated mobile device can be employed with the mobile device to make a financial payment or credit/debit card payment or funds transfer using the USR. At act 470, the mobile device can be activated to make a direct personal payment and/or funds transfer between accounts within the USR, including third-party accounts. In accordance with a further embodiment, at act 472, the device can be activated to allow the user's identity to be determined and their actions authorized in a number of other situations, for example, to gain access to a secure computer network, to perform other types of commercial transactions, to proceed through security checkpoints, access physical facilities, etc.

Returning again to act 468 and the use of the mobile device with USR based identification system, the process 460 can be employed at a point-of-sale. For example, a user located in a store or other commercial environment at the point-of-sale. The transaction details are communicated from the point-of-sale to the mobile device for review by the user. Such transaction details can include information, for example, the purchase amount, the name of the vendor, time and date, and even a list of the individual item or items that are being purchased. This provides the user with an opportunity to review and approve the transaction on their mobile device. At act 474, the user can elect to accept the transaction by, for example, selecting an element in the user interface of the mobile device or cancel the transaction. Where, for example, the user elects to cancel the transaction, the process 460 ends at act 476. Alternatively, should the user accept the transaction, the process moves to act 478. At act 478, the mobile device generates a random one-time code as described, for example, in the embodiments of FIG. 4. At act 480, the one-time code is communicated to the USR along with the transactions details. In some embodiments, the transaction details can include a code representing one of a plurality of accounts.

The communication with the USR can occur via the POS or independent of the POS, depending on the embodiment. At act 482, the USR receives the random one-time code and employs the code-matching search to identify the user. The user is identified when a match is found between the random one-time code communicated to the USR and the USR-calculated codes determined for the registered group or groups of users. This registered group or groups of users can be those other registered users who also employ the identification approach described herein. Alternatively, the various group or groups can be divided into subgroups of users who may have some common association or identifying feature that USR can employ in organizing and segmenting the data in the database to increase the processing speed of the code-matching algorithm. Regardless of the size of the group, however, the USR employs a code-matching search and identifies the user when a match is found between a USR-calculated code included among a plurality of codes calculated for the plurality of users, respectively, and the code generated with the mobile device.

At act 484, the USR determines whether the identified-user is authorized to complete the transaction, for example, does the identified-user have a financial account with USR and if so are they credit-worthy. At act 488, the USR communicates a denial of a transaction if the identified user is not authorized to complete such a transaction. At act 486, the USR communicates an authorization, for example, communicates the authorization to the point-of-sale along with a digital image of the user if the identified user is authorized to complete the transaction. The digital image may come directly from USR or partially from USR and partially from the mobile device.

According to some embodiments, the random one-time code generated at act 478 is communicated along with static identifying information at act 480, for example, where a verification process is employed to authenticate the identity of the user of the mobile device. According to other embodiments, static identifying information is not communicated to USR with the random one-time code generated at act 478, for example, where an identification process is employed to authenticate the identity of the user of the mobile device.

In addition, a device activation process (for example, the device activation provided in by acts 462, 464, 466) can be employed without the remaining acts included in the process 460 illustrated in FIG. 5. For example, the acts 462, 464, 466 can be employed independently in a process that may not include any communication with the USR and/or may not include generation of a one-time code using the mobile device.

Figure 7:
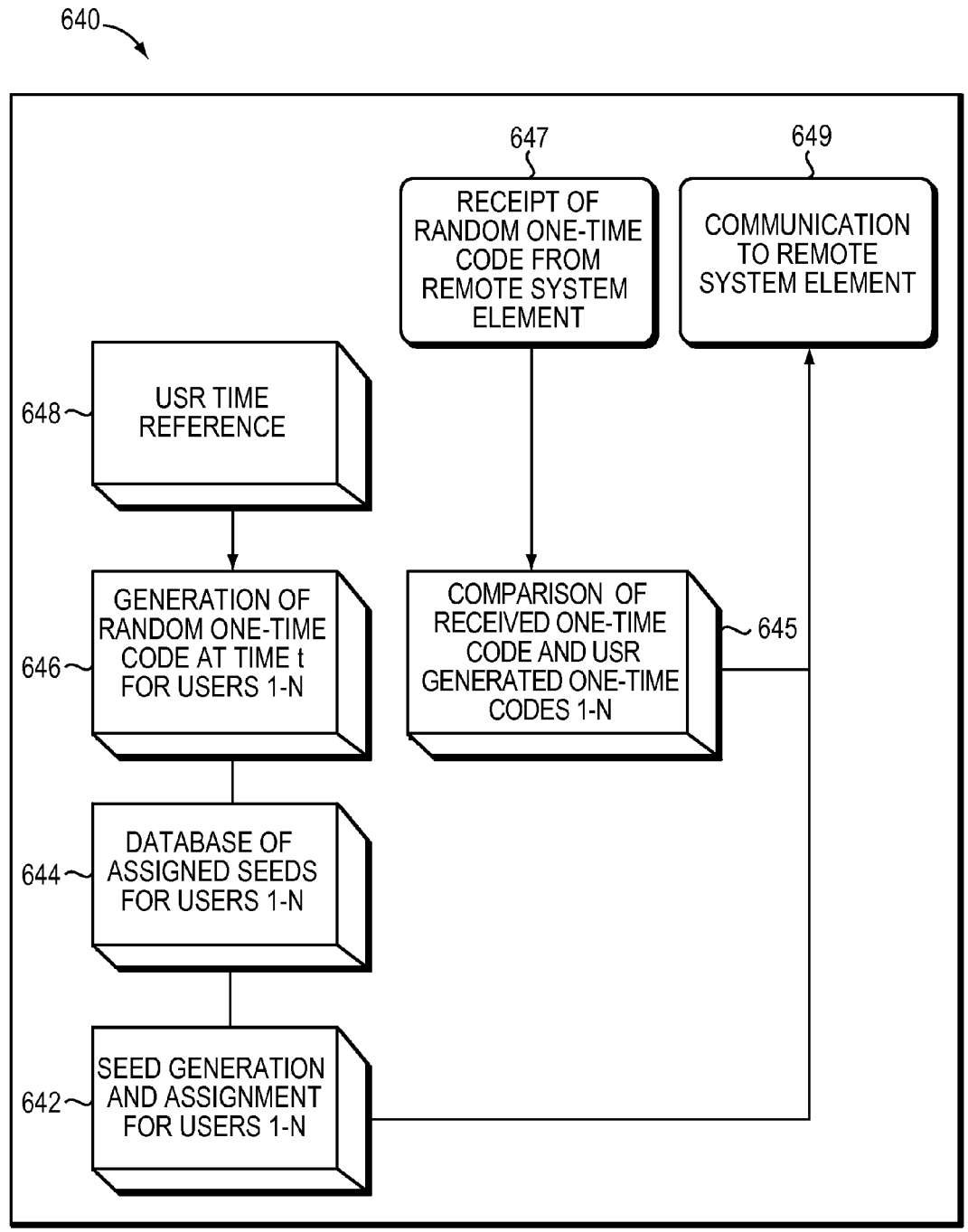
FIG. 7 is a functional block diagram of a system in accordance with some embodiments.

Referring now to FIG. 7, a functional block diagram of the USR is illustrated in accordance with one embodiment. According to some embodiments, the USR 640 is employed to identify a user from among a plurality of users based on the receipt of a random one-time code from a remote system element. According to various embodiments, the remote system element can include any of: an electronic device such as a handheld electronic device; a point-of-sale device; a computer, server or other network device, for example, wireless user devices 652 and 735 described herein. Accordingly, in some embodiments the remote system element includes a mobile phone such as a smart phone. Further, in some embodiments, any of the elements illustrated in FIG. 7 can be included in the USR systems or portions thereof illustrated in FIGS. 1-3 either alone or in any combination with other elements described herein.

In the embodiment illustrated in FIG. 7, the USR 640 includes a seed generation module 642, a database of assigned seeds 644, a generation module 646, a time reference 648, a comparison module 645, a first communication module 647 and a second communication module 649. Other arrangements and system configurations are possible depending upon the desired functionality. For example, the embodiment illustrated in FIG. 7 can be employed with the USR system configurations illustrated herein. Accordingly, in some embodiments system elements that communicate with the USR to execute the processes illustrated in FIGS. 32, 33 and 34 can include any of the mobile device 674, the POS terminal 676, the interface device 682, the mobile device 652, the network access device 658, the wireless user-device 735 and the computer 736 as some examples. In some embodiments, one or more of the preceding system elements can communicate with the system 640 via the second communication module 649. Further, functionality other than that illustrated in FIG. 7 can also be provided with the USR. In particular, the USR illustrated in FIG. 7 can include functionality such as any or select portions of the functionality described herein concerning other embodiments of the USR. Further, any of the illustrated modules can be configured in hardware, software or a combination of hardware and software depending upon the embodiment.

Accordingly, it should be appreciated that embodiments can include other modules and/or modules configured differently than those illustrated. For example, the first communication module 647 and the second communication module 649 can be included in the same module; the comparison module 645 can include a database, data-table or data-tree to store the current random one-time codes for comparison, or alternatively, a separate database, data-table or data-tree can be included to store the current random one-time codes which are provided to the comparison module 645 for comparison. In various embodiments, each of the modules included in the USR 640 is coupled to others of the modules.

According to one embodiment, the seed generation module 642 is in communication with at least the database module 644 and the second communication module 649. The database module 644 is in communication with at least with the generation module 646. Further, in the illustrated embodiment, the time reference 648 is in communication with the generation module 646. In addition, the generation module 646 is in communication with the comparison module 645, while the comparison module 645 is also in communication with each of the first communication module 647 and the second communication module 649.

In accordance with one embodiment, the seed generation module 642 operates to randomly generate (for example, without replacement) and assign seeds for a plurality of users registered with the USR, for example, users 1-N. Further, the generation module 642 communicates the seeds and their assignments to the database module 644 where the assigned seed associated with each user for a given time period are stored in association with one another such that they can be searched and retrieved. According to a further embodiment, a separate assignment module is included in the USR and operates to receive the seeds from the seed generation module 642 and assign the seeds to the plurality of users. In accordance with various embodiments, the database module 644 can include a relational database such as relational database such as Oracle® Database by Oracle Corp. of Redwood Shores, Calif., Advantage Database Server or SQL Anywhere, each by Sybase of Dublin, Calif., MySQL™ by Sun Microsystems of Santa Clara, Calif., DB2® by IBM Corp. of Armonk, N.Y., or InterBase by Embarcadero Technologies of San Francisco, Calif. In other embodiments, the database module can include an object-oriented database such as InterSystems CACHE by InterSystems Corp. of Cambridge, Mass., JADE by Jade Software Corp. of Christchurch, New Zealand, or FastObjects by Versant Corp. of Redwood City, Calif.

In accordance with some embodiments, the second communication module 649, communicates seeds to the system elements including user-devices, secured computers and other elements included in the USR system. In one embodiment, seed updates are performed without requiring any user interaction. For example, in one embodiment, a seed in a user device or remote USR element (for example, the USR element 768 illustrated in FIG. 12) is updated in the background at a time when the device or registry element are in communication. In a further embodiment, the update occurs without knowledge of the user. Thus, the systems described herein can include automatic reseeding of remote end user devices and USR systems elements.

In accordance with the illustrated embodiment, the generation module 646 receives a time reference from the time reference module 648 and receives the assigned seeds and users from which it generates random one-time code at the time T for the users 1-N and communicates that information to the comparison module 645.

According to some embodiments, the comparison module 645 receives, via communication module 647, a random one-time code from a remote system element such as mobile device, POS device or the like and compares, using a code-matching search, the received random one-time code with those generated by the generation module 646 to determine whether a match exists. Depending on the embodiment, the communication of the random one-time code can be over a network such as the networks 28, 656 and 738 as illustrated and described herein. According to some embodiments, the current codes of a plurality of users are organized in a table, for example, a table that is organized numerically. In one embodiment, the table can be searched using a search algorithm such as a binary search. In a further embodiment, the search begins by comparing the value that is sought to the middle item of the table. If the value matches the middle item, the search is successful. If the value is less than the middle item, then the higher half of the table is eliminated from the search. If the value is greater than the middle item, then the lower half of the table is eliminated. The process is then repeated, for example, depending on the embodiment either iteratively or recursively, within each remaining half of the table until a match is identified. According to various embodiments, other search techniques may be used to search the table.

In other embodiments, the current codes of the plurality of users are organized in a tree data structure. According to one embodiment, the tree can be searched using a search algorithm, such as a binary search tree. For example, a tree can include a plurality of nodes connected in a hierarchical tree structure, where each node to the left of a root node only contains a value less than the value that is contained in the root node, and where each node to the right of the root node only contains a value greater than contained in the root node. Using a binary search tree, the search begins by comparing the value that is sought to a value stored in the root node of the tree. If the value matches, the search is successful. If the value is less than the value of the root node, for example, then the nodes of the left subtree are searched iteratively or recursively. If the value is greater than the value of the root node, then the nodes of the right subtree are searched. This process is repeated, descending the nodes of each subtree, until a match is identified. According to various embodiments, other search techniques may be used to search the tree data structure.

As should be appreciated, the USR 640 illustrated in FIG. 7 can be employed in embodiments that use an identification process and embodiments that use a verification process. Where an identification process is used, the random one-time codes received by the first communication module 647 are received without any static identifying information. The comparison module 645 compares the received code with the current codes for a plurality of users to authenticate an identity of the user. Where a verification process is employed, a static nominal constant is included with the random one-time code, for example, appended to the random one-time code as a suffix or prefix. Here, the comparison module 645 indexes the database by the static number to verify an identity of the user by determining whether the current random one-time code is associated with the user who is identified by the static number. In some embodiments, the random one-time code is discrete and constantly changing with each change from one period of time to the next.

It should also be appreciated that the system illustrated in and described with reference to FIG. 7 can be employed with any embodiment described herein in which the USR is employed to authenticate identity (using either an identification process or a verification process) based on receipt of a random (or pseudo random) one-time code.

Figure 8:
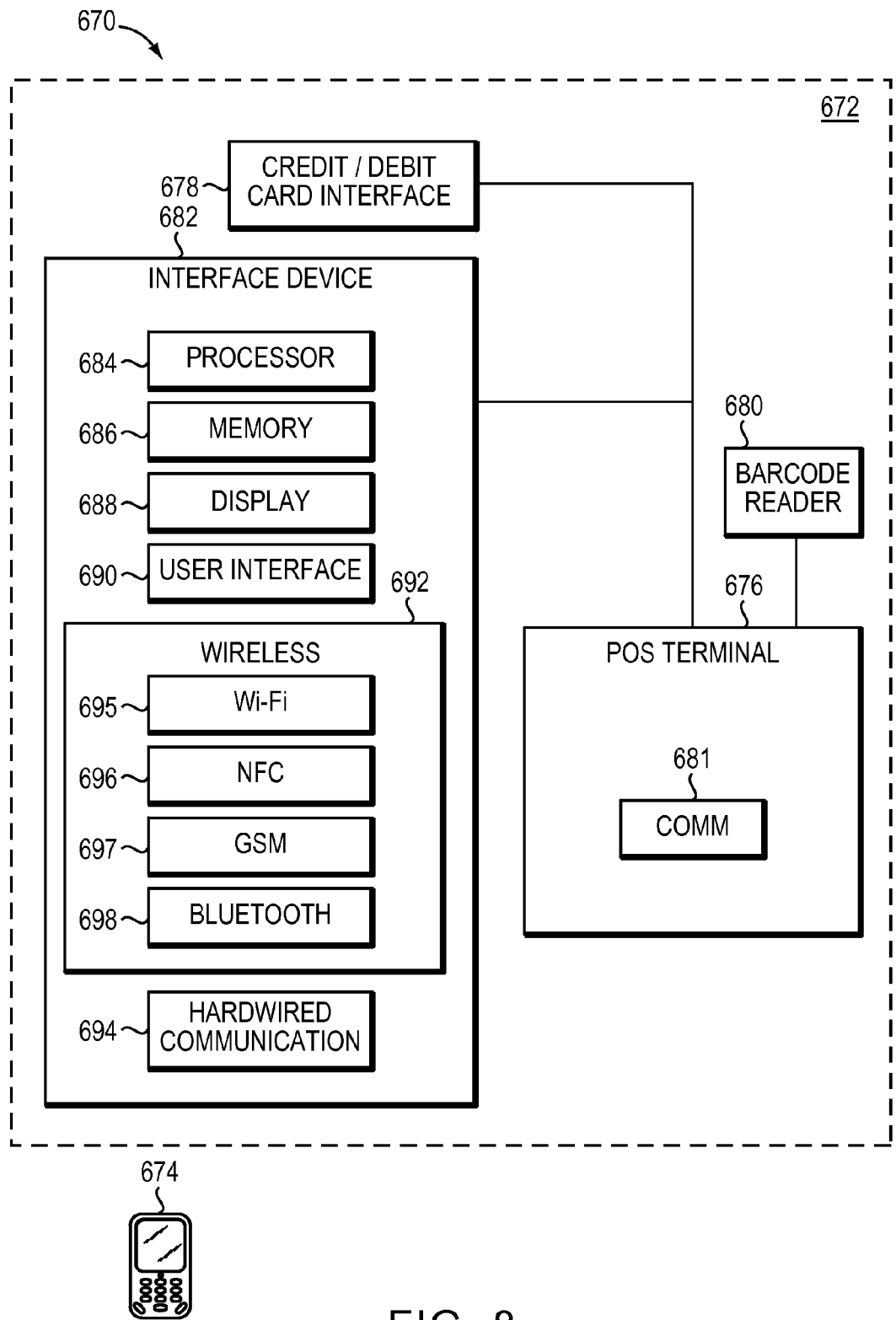
FIG. 8 is a functional block diagram of a system in accordance with some further embodiments.

Referring now to FIG. 8 a system 670 includes a POS system 672 and a mobile device 674. According to some embodiments the mobile device 674 can include a wireless device, for example, a tablet computer, netbook computer, laptop computer, a mobile phone, a PDA, a smart card, electronic passport and the like.

In accordance with some embodiments, the POS system 672 includes a POS terminal 676, a credit/debit card interface 678, and a barcode reader 680. Further, according to some embodiments, the POS system 672 includes a communication interface 681 which can include a wireless communication device and/or a hardwired communication device. In accordance with various embodiments, the system element of the POS system 672 can include conventional system elements such as a conventional POS terminal, conventional credit/debit card interface and a conventional barcode reader. In various embodiments, the system 670 can include more or fewer elements than those illustrated in FIG. 8. However, in addition to any of the preceding, the POS system 672 includes an interface device 682 which is integrated with the POS system 672. In accordance with some embodiments, the interface device 682 includes a processor 684, a memory 686, a display 688, a user interface 690, a wireless interface 692 and a hardwired communication interface 694.

In accordance with some embodiments, the interface device 682 operates to allow a registered user of the USR in possession of the mobile device 674 to conduct transactions using the USR and the conventional POS system elements. For example, the mobile device 674 can be used by the user to conduct a transaction in the manner illustrated and described with reference to FIG. 4.

In accordance with some embodiments, the interface device 682 is employed by an operator of the POS terminal of the POS system 672, for example, a cashier or service person. Further, in some embodiments the POS terminal 676 includes a cash register as is traditionally found in a retail establishment.

In accordance with various embodiments, the credit/debit card interface 678 can include a magnetic stripe card reader or other means by which account information is traditionally provided by the credit/debit card holder to the point-of-sale system. Thus, in some embodiments the credit/debit card interface can include a wireless interface that can, for example, communicate wirelessly with a smart card. However, as indicated here, these traditional credit/debit card interfaces may not always be configured to allow a user of a mobile device 674 to take advantage of the functionality and greater security provided by the USR for financial transactions even where the mobile device 674 includes a smart card. Thus, the interface device 682 provides transitional hardware and software to allow the user of the mobile device 674 to take advantage of the functionality and increased security provided by the USR. These advantages are also beneficial to the operator of the POS system 672 because they provide a higher degree of security for financial transactions that are conducted using the POS system 672. The increased security can be provided as described herein by using the USR and the mobile device in an identification process rather than a verification process to authenticate the user of the mobile device 674 and to confirm their credit worthiness.

In accordance with one embodiment, the processor 684 includes a memory 686 while in accordance with other embodiments at least some of the memory 686 is external to the processor. In accordance with some embodiments, a microcontroller is included in the interface device 682 where the microcontroller includes the processor 684 and at least some of the memory 686.

Further, in accordance with some embodiments, the display 688 includes an LCD display that can be employed by either or both of the operator of the POS system 672 and the user of the mobile device 674 to display information. The user interface 690 can include a touch screen integrated in the display 688 that employs icons or other graphical symbols to allow operation of the interface device 682 to facilitate processing of the financial transaction.

In accordance with various embodiments, the interface device 682 includes any one or any combination of wireless communication protocols and associated hardware including any of Wi-Fi communication 695, near field communication (NFC) 696, GSM (or other cellular communication protocols) 697 and Bluetooth communication 698. In accordance with various embodiments, one or more of these wireless communication protocols can be employed to communicate between the interface device 682 and the mobile device 674 as well to communicate between the interface device 682 and the USR. In other embodiments, alternate forms of wireless communication protocols and/or hardware can be employed in the system 670. According to some embodiments a first wireless network included in the wireless interface 692 is employed to communicate locally between the mobile device 674 and the interface device 682 while a second of the wireless networks 692 is employed to communicate between the interface device 682 and the USR. In further embodiments, a wired communication network is connected to the communication interface 681.

In general, the interface device 682 operates to receive and display transaction information concerning the transaction being conducted between the user of the mobile device 674 and the operator of the POS terminal 676 by, for example, displaying transaction details, authentication requests, approvals, and the like to either or both of the user of the mobile device 674 and the operator of the POS system 672 on the display 688. Thus, in some embodiments the interface device 682 receives the information that is generally provided to the credit/debit card interface 678 concerning the transaction such as the total transaction amount, the cost of individual items being purchased, account information concerning an account of the user of the mobile device, merchant identification and current time and date. In some embodiments, this information is received and displayed at the interface device 682 and also at the credit/debit card interface 678 in the traditional manner, however, where the USR is employed the interface device 682 can operate to take the place of the credit/debit card interface 678. For example, the interface device can receive the information necessary to authorize and complete the transaction from the mobile device 674. In one embodiment, the electrical connection of the interface device 682 to the POS terminal 676 can be completed by connecting the interface device 682 in series between the POS terminal 676 and the credit/debit card interface 678. According to this embodiment, signals are transmitted from the POS terminal 676 to the interface device 682 and are then communicated to the credit/debit card interface 678. According to another embodiment, the interface device 682 is connected in parallel with the credit/debit card interface 678 such that communication of data from the POS terminal 676 occurs with the direct receipt of the information by each of the credit/debit card interface 678 and the interface device 682.

In operation, and in accordance with one embodiment, a user of the mobile device 674 activates the mobile device 674 for conducting a financial transaction such as a purchase of an item at a retail or other commercial establishment. In accordance with one embodiment, the device is activated in the manner illustrated and described at acts 462 to 466 of FIG. 5. That is, the user first enters a PIN in the mobile device and communicates it to the USR. Following a receipt of the PIN by the USR a multi character numeric value is communicated to the mobile device and the user's spoken input of the numeric value is employed to authenticate the user and activate the device for the transaction. In accordance with one embodiment, the communication between the mobile device 674 and the USR to activate the mobile device 674 is conducted without employing the interface device 682. Thus, in accordance with one embodiment, the communication is over cellular network or other wide area network between the mobile device 674 and the USR.

Once the mobile device 674 is activated, the communication link can be established between the mobile device 674 and the POS system 672. In general in these embodiments, a wireless communication link is established between the mobile device 674 and the POS system 672 via the interface device 682. The user or an operator of the POS terminal 676 can employ a barcode reader 680 or other conventional means to enter information that identifies the item or items being purchased into the POS system 672. The POS terminal 676 receives the information concerning the selected item or items and processes it in a conventional manner to provide a total transaction amount.

In accordance with one embodiment a transaction summary is communicated to the user's mobile device for display, review and approval. In some embodiments, the transaction summary is communicated via the interface device where it may it also be displayed using the display 688. This provides the user with an opportunity to review and if agreed, accept the transaction and request authorization from the USR to execute the transaction. In accordance with one embodiment, the USR application provided on the mobile device 674 allows the user to select an acceptance key or icon to indicate their agreement with the transaction, see for example, act 474 in FIG. 5. In accordance with further embodiments, the mobile device 674 using the USR application operates to generate a random one-time code and communicate the random one-time code to the USR along with all or some of the transaction details. As is described with reference to FIG. 5, the USR performs a code matching algorithm to identify the user by locating a match between the USR calculated code included among a plurality of codes calculated for a plurality of users, respectively, and the code generated by and communicated from the mobile 674. According to some embodiments, the communication between the mobile device 674 and the POS and the USR can be completed at this stage using the information provided from the POS system 672 but without the need to communicate directly between the POS terminal 676 and the USR. However, successful completion of the code matching algorithm and check for the credit worthiness of the user of the mobile device 674 results in the USR communicating an approval back to the merchant and/or operator of the POS system 672. In a further embodiment, an acknowledgement of the transaction-approval is also provided to the mobile device from the USR. According to some embodiments, the receipt of this information occurs at the interface device 682 where it is displayed to the operator of the POS terminal 676. According to another embodiment, the communication from the USR of the acceptance or denial of the transaction is communicated to one of the conventional elements included in the POS system 672, for example, the POS terminal 676.

In some embodiments, the mobile device 674 communicates the random one-time code to the POS system 672. According to these embodiments, the POS system 672 combines the code with information concerning any or all of the selected products and prices and a merchant account code. The combined information is communicated from the POS system 672 to the USR. Here too, a successful completion of the code matching algorithm and check for the credit worthiness of the user of the mobile device 674 results in the USR communicating an approval back to the merchant and/or operator of the POS system 672.

According to further embodiments, the USR can be employed to provide apparatus, systems and methods to conduct financial transactions between parties directly, securely and with greater convenience than current approaches. Further, in various embodiments, these approaches provide increased security relative to known approaches by eliminating the necessity to communicate any of, or at least any one of, account numbers, user names, PIN numbers or passwords. In addition, some embodiments are employed in mobile devices that allow flexibility in where and how these approaches are employed. For example, in various embodiments the secure financial transactions can be conducted with a user's mobile device at vending machines, parking meters and at a variety of other locations. Further, the approaches described herein can be employed even in situations in which the parties to the transaction (for example, two users employing mobile devices) are not in communication with the USR at the time of the transaction and/or not in close proximity to one another.

According to one embodiment, two users, each registered with the USR and each having a funds transfer account, in close proximity to one another, intend to conduct a transaction that will result in a transfer funds between their accounts. Each user independently activates their respective mobile device, for example, using the approach illustrated and described concerning acts 462-466 of FIG. 5. According to some embodiments, the device activation includes multifactor authentication in which a biometric is employed. Further, in some embodiments, the current seed provided from the USR is used in combination with the biometric to activate the device. In some embodiments, the activation of the two mobile devices can include separate authentication protocols such that the user of a first mobile device is identified in a multi-factor authentication process that does not employ a biometric and the user of a second mobile device is identified in a multi-factor authentication process that does include a biometric.

According to a further embodiment, the mobile devices can store default values which can be employed in a financial transaction. The default values can be used to allow a more rapid completion of the transaction by reducing the amount of data that must be entered by the user of the mobile device.

In some embodiments, the two users select the "Funds Transfer" application via the user interface of the respective mobile devices, for example, by using a keypad (a soft keypad, a pushbutton-style keypad, etc.) or an icon located in a graphical user interface displayed at the mobile device. Once the two users have opened the applications, the payer-user enters the amount of the transfer. According to some embodiments, the payee-user then presses a "receive" control element (GUI icon, pushbutton etc.) which is available at the payee's mobile device via operation of the funds-transfer application. According to some embodiments, the payer-user presses a "send" control element (either alone or in combination with the payee-user pressing the "receive" control element) which is available on their mobile device via operation of the funds-transfer application.

Communication is opened between the two mobile devices and data is exchanged. According to the embodiment, a selected one of a variety of wireless communication protocols can be employed. These may include Bluetooth, NFC, or infrared or other optical or RF signals depending on the embodiment.

According to another embodiment, the mobile devices each include an accelerometer, shock switch or other shock sensor such that communication between the two devices can be initiated when the two users bring the two mobile devices into contact with one another. For example, the two mobile devices can be "bumped" into one another (directly or indirectly, for example, via contact between the users' hands) so that the transmitted shock/vibration acts on each to open communication via the funds-transfer application. In addition, the preceding can be employed in combination with other user acts such as a selection of an icon in the display of the user's mobile device.

In some embodiments, the two devices can remain in communication for completion of the funds-transfer authorization via the USR. According to one approach, the user-payer employs the mobile device to generate and communicate to the USR a first random one-time code that is employed by the USR to identify the payer. Further, the user-payee employs their mobile device to generate and communicate to the USR a second random code that is employed by the USR to identify the payee. The USR can separately employ a code-matching algorithm, as described herein, to perform the identification of the parties to the transaction.

In general, at least the payer includes the transaction amount in the communication with the USR while in a further embodiment, each of the payer and the payee communicate the agreed upon transaction amount to the USR. According to this later embodiment, the transaction amounts must agree for the transaction to proceed.

According to some further embodiments, the USR separately authenticates itself to the two mobile devices employed in the transaction by generating a subsequent random one time code based on a seed associated with the respective mobile device and the current time. The one time random code generated by the USR for the user-payer is communicated to the payer's mobile device and the one time random code generated by the USR for the user-payee is communicated to the payee's mobile device. The two mobile devices each employ their respective seed with the time that the USR generated the random one-time code to confirm the identity of the USR.

The USR can communicate (subsequent to or along with the communication of the respective random codes) a digital image of the payer to the payee and a digital image of the payee to the payer. Further, for added security, the USR can transmit multiple images (for example, a "line-up" of images) of a plurality of individuals to the two parties and the funds transfer is not finalized until the payer accurately selects the image of the payee and the payee accurately selects the image of the payer from among the respective plurality of images which are received. Security of such an approach can be increased by allowing each of the parties only one or some other limited number of selections in which to accurately identify the correct image.

The parties communicate via the respective mobile devices the confirmation of the visual identity of the other party to the USR which then operates to transfer (for example, electronically transfer) the requested amount of funds from the payer's account to the payee's account.

According to some embodiments, a funds transfer can also be completed between a payer and payee even where the two parties are not in proximity with one another. According to these embodiments, the payer activates their mobile device and selects the funds transfer application. The payer then enters an identifier that identifies the payee such as the payee's mobile phone number, the payee's email, etc. along with the amount of the transfer. The payer communicates with the USR and transmits a one-time random code that the USR employs to identify the user. The USR identifies itself to the payer by transmitting a subsequent random one-time code based on the seed associated with the payer's mobile device and the current time. According to this embodiment, the payer confirms the identity of the USR based on the received one-time random code. In some embodiments, the payee is identified by the USR and the payee confirms the identity of the USR in a similar manner. Here too, the USR can communicate a digital image of the payee to the payer and an image of the payer to the payee for increased security. Provided that the preceding identity-process is successfully completed, in some embodiments, the payer can then select the "pay" soft-key provided by the funds transfer application.

According to another embodiment, the USR and a mobile device of a registered user with a funds transfer account can be employed by the user to conduct transactions (for example, make purchases) at a vending machine, self service check out, unmanned-kiosk and the like. According to these embodiments, the owner or proprietor of the unmanned system is also registered with the USR and has an account that includes the funds transfer option. According to this embodiment, the payer opens the funds transfer application as previously described and communicates with the unmanned system to conduct a transaction. Information concerning the transaction such as the selected item, the cost, sales tax (if any), the identity of the parties and the like can be communicated. According to one embodiment, the owner or proprietor is a corporation or other business entity. According to this embodiment, the logo of the business entity is communicated to the mobile device for display to the user. The user can visually confirm that they are dealing with the correct business entity and then enter the amount of the transaction and accept the purchase by selecting the appropriate soft-key generated by the funds transfer application.

According to some embodiments, the funds transfer described in the preceding paragraph is completed using an authentication process with the USR on a substantially real-time basis. For example, the identity of the payer can be performed as described above prior to the payer receipt of the item. Where real-time communication between the mobile device and the USR is unavailable for the transaction, the actual funds transfer is completed at a later point in time as described below.

According to any of the preceding embodiments, execution of financial transactions (including purchases, etc.) approved and authorized by a payer and a payee can be deferred if the two parties are not in communication with the USR at the time the parties agree to the transaction. The completion of the transaction including the communication of the random one-time codes, successful identification of the USR and cross-identification by the parties can be separately completed by the payer and the payee when they are next in communication with the USR. The USR can defer the transaction until each of the two parties completes the parts of the transaction for which they are responsible. According to some embodiments, the communication between the users' mobile devices and the USR is automatically established when such communication is next available.

Figure 6:
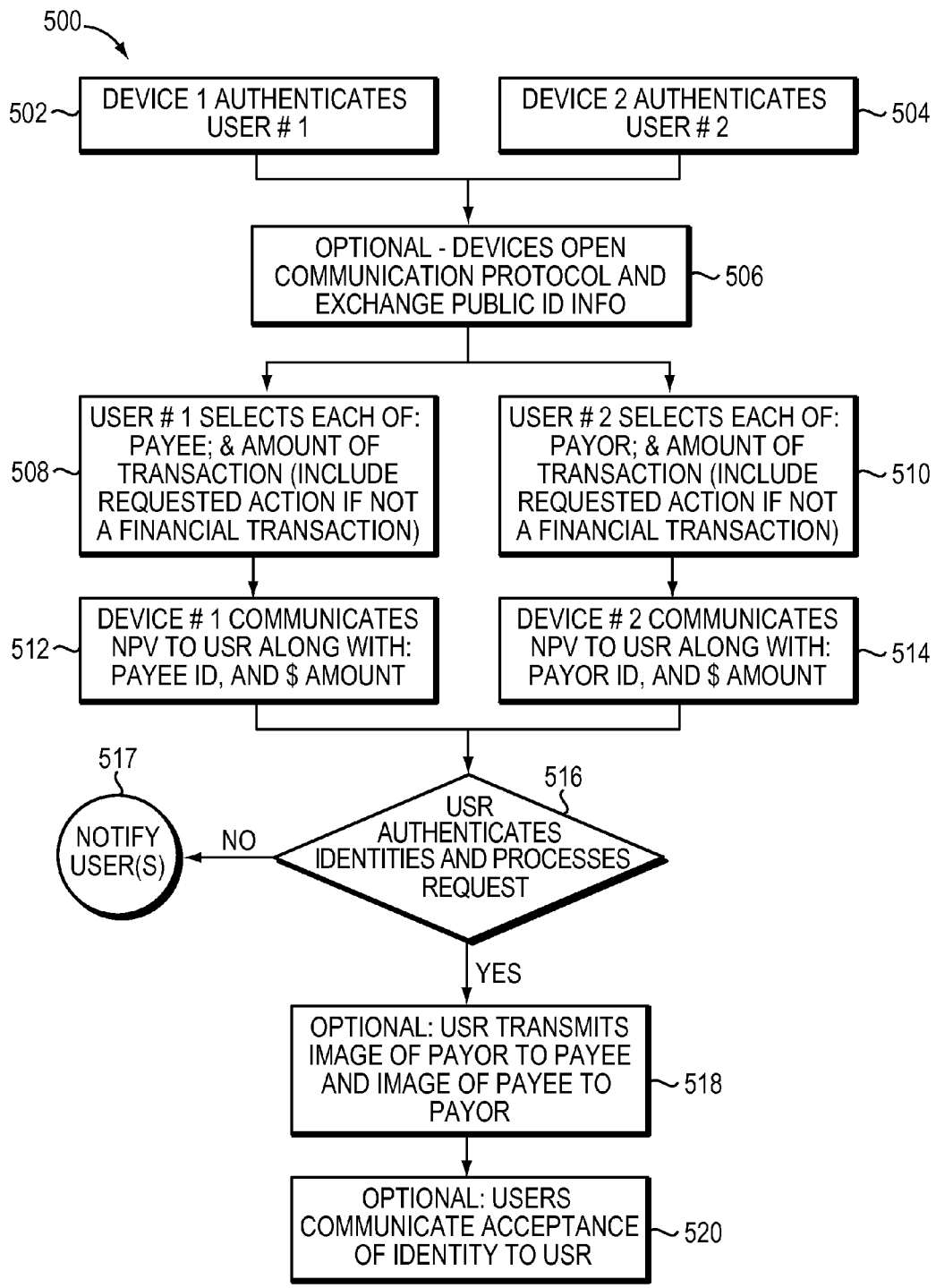
FIG. 6 is a flow chart in accordance with still another embodiment.

Referring now to FIG. 6, a process 500 is illustrated by which users can employ their mobile devices for use in a personal payment transaction, or other types of interactions during periods where the user devices are in communication with USR. The process generally includes the authentication of the users by their respective devices, for example, by their mobile devices. The process 500 may, in some embodiments, also include communication between the two devices, for example, wireless communication between the two devices. However, in other embodiments, communication between the two devices is not employed. In some embodiments, identities of each of the two users are authenticated by USR. In other embodiments, USR authenticates an identity of only one of the two users, for example, the payor. Further, in some embodiments, USR authenticates itself to either or both of the devices via a "handshake" process as described below.

The approaches described herein generally employ multi-factor authentication. According to some embodiments, the approaches employ 3+ factor security. As referred to herein 3+ factor security employs each of something the user knows, something the user has, and something the user is, and in addition, employs one of the preceding three factors more than once. Such approaches are described in greater detail herein.

Referring to the process 500, at Act 502, user #1 is authenticated by their mobile device (Device 1). Similarly, at Act 504, user #2 is authenticated by their mobile device (Device 2). According to some embodiments, the process 500 includes Act 506 in which Device 1 and Device 2 establish a communication protocol with one another. The communication protocol may allow the wireless exchange of identifying information (for example, public identifying information) for each of user #1 and user #2. For example, Device 1 can transmit a public ID of user #1 to Device 2 while Device 2 transmits a public ID of user #2 to Device 1. Act 506 is identified as optional because, according to some embodiments, the process 500 is completed without any direct communication between Device #1 and Device #2.

Although the current embodiment is described with reference to a financial transaction that involves user #1 and user #2, the approaches described herein may be employed by two or more parties to authorize (and/or agree to) a variety of actions. According to these embodiments, the user selects an identity of the other party(ies), the agreed upon act, and if necessary, any other details, constraints or qualifiers. As will be apparent to those of ordinary skill in the art, the party identification is in the form of something other than a "payee" or "payor" where the action does not involve a payment. Further, regardless of the form of transaction the identification of the parties to the transaction can include the identification of an entity such as a company or other organization rather than an individual.

According to one embodiment, at Act 508 user #1 selects each of the payee and an amount of a financial transaction. Further, user #1 can also select, at Act 508 an amount of the transaction and/or an account type (or other identifier) suitable with the selected transaction.

According to this embodiment, user #1 can select/enter the payee identification using data stored in the mobile device or by manually entering the ID information in the device. According to one embodiment, the identifying information of user #2 is located in the contact or address book in Device 1. Therefore, depending on the embodiment, the identifying information of user #2 can be provided by user #1 in the form of any of a name, a shorthand identification, an email address or phone number of user #2 which is selected from the contacts stored in Device 1. Alternatively, where the process 500 includes the Act 506 the payee identification can be provided to user #1 by transmission from Device 2 to Device 1. Similarly, at Act 510 user #2 selects each of a payer (user #1) and an amount of the financial transaction.

In some embodiments, the information selected by user #1 is communicated to USR at Act 512 (for example, wirelessly transmitted). In addition, Device 1 can be employed to generate a non-predictable value, as described elsewhere herein, that is used to authenticate the identity of user #1 at USR. In the illustrated embodiment, the transmission of the non-predictable value is included in Act 512. According to other embodiments, the non-predictable value is transmitted in a separate act that precedes Act 512. In addition, Act 512 can be preceded with a step or series of steps included in the process 500 in which USR authenticates itself to the device. For example, as illustrated in the process 580 of FIG. 10.

At Act 514, user #2 employs Device 2 to generate and communicate a transaction request/authorization to USR in a similar manner to that described with reference to Act 512. Here too, a non-predictable value can be communicated from the user's device (Device 2) to USR along with the payer ID and the dollar amount of the transaction. Further, according to some embodiments, Device 2 can be employed to generate a non-predictable value, as described elsewhere herein, that is used to authenticate the identity of user #2 at USR. In addition, Act 514 can be preceded with a step or series of steps in which USR authenticates itself to the device. For example, as illustrated in the process 580 of FIG. 10. At Act 516, USR authenticates identities of user #1 and user #2, respectively.

According to various embodiments, Act 516 can include one or more additional acts. For example, provided that the authentication of user #1 is successful, USR can also check the availability funds for the requested transaction.

At Act 517, where the authentication of either or both of user #1 and user #2 is unsuccessful or the necessary funds are unavailable USR can communicate the fact to either or both of user #1 and user #2. According to some embodiments, the process 500 ends where at least one of the authentications is unsuccessful. In some embodiments, following act 517, the process 500 can include a subsequent attempt to complete the transaction by either or both of user #1 and user #2.

According to further embodiments, execution of the transaction can also require confirmation by the respective users of the identity of the others. For example, as illustrated in FIG. 6, at Act 518 USR transmits an image of the payer (user #1) to the payee (user #2) and an image of the payee to the payer for local authentication of identity by the parties to the transaction. According to this embodiment, an image of the payer (user #1) appears on display of Device 2 and an image of the payee (user #2) appears on a display included in Device 1.

According to this embodiment, USR defers executing the transaction until the users accept the identity of one another based on the image, see Act 520. For example, where user #1 accepts the identity of the displayed image of user #2 and communicates acceptance to USR (for example, by selecting a key or icon included in the display of Device 1) and user #2 confirms the identity of user #1 in the same manner using Device 2. In accordance with some embodiments, only one of the two parties to the transaction receives an image of the other. In accordance with still other embodiments, neither party receives an image of the other, for example, the process 500 does not include Act 518. Here too, the process can terminate where USR does not receive either or both of the acceptances.

According to some embodiments, the process 500 does not include Act 506. Instead, the mobile devices of the two users do not directly share any information with one another. According to this embodiment, Device 1 communicates identification of the payee in the form of the identification selected from data included in the mobile device or manually entered by user #1. User #2 can employ the same approach using Device 2 to identify the payor.

Figure 9:
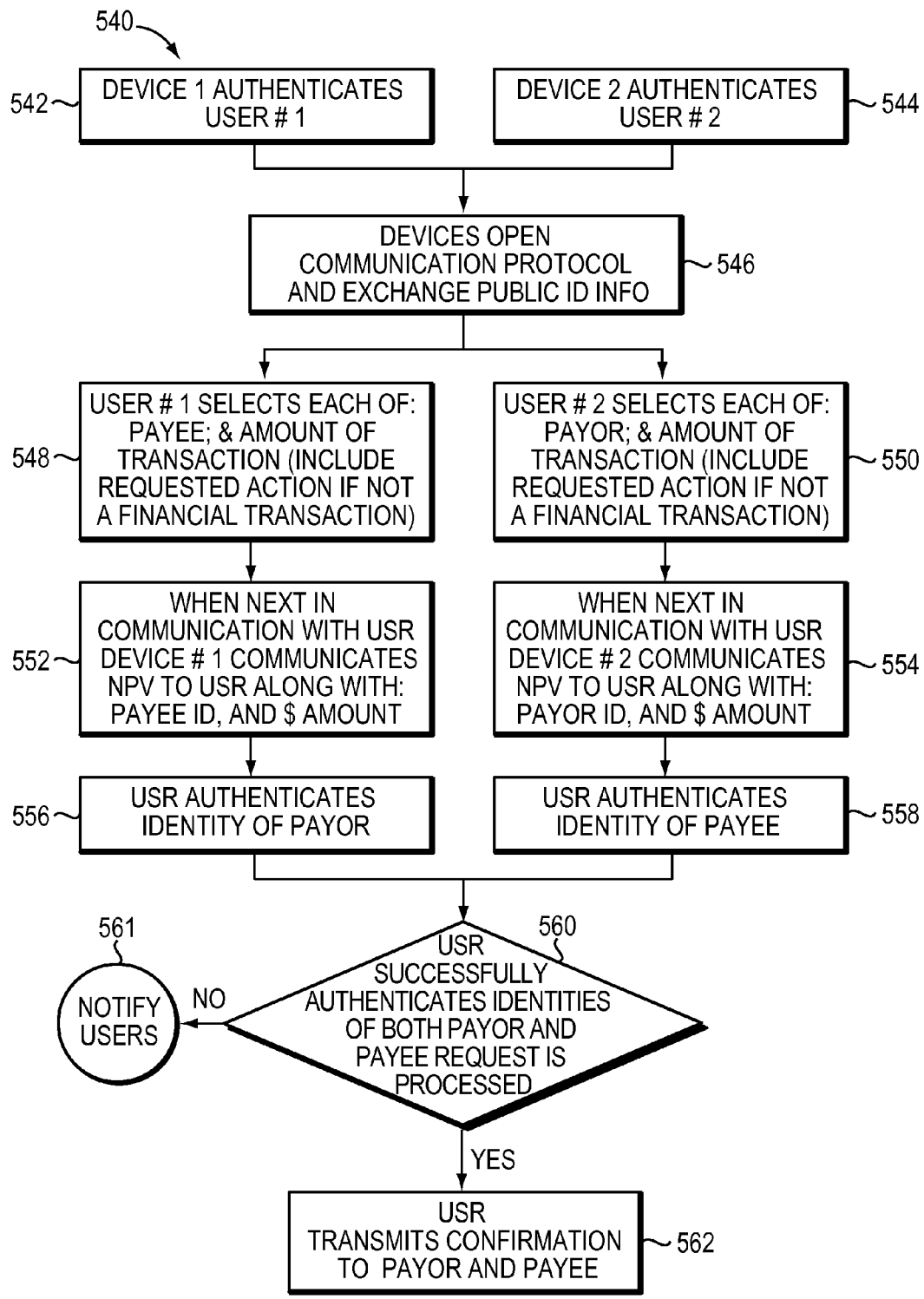
FIG. 9 is a flow chart in accordance with one embodiment.

Referring now to FIG. 9, a process 540 is illustrated where a transaction is initiated by two users in situations in which either or both of the associated devices is not in communication with USR. This is sometimes referred to as an out-of-band transaction. At Act 542, Device 1 authenticates user #1 and at Act 544, Device 2 authenticates user #2. Either of Act 542 and Act 544 can be accomplished as described elsewhere herein by local authentication of the user, respectively (for example, by the user's mobile device).

At Act 546, the devices open a communication protocol with one another to initiate the transaction by, for example, exchanging public ID information as described concerning Act 506 illustrated in FIG. 6. According to other embodiments, the process 500 does not include a direct communication between the two devices and the mobile devices of the two users do not directly share any information with one another. Instead, the public ID info is provided to the USR by the respective user as described with reference to the process 500.

At Act 548, user #1 selects each of a payee and an amount of the desired financial transaction. Similarly, at Act 550, user #2 selects each of the payer and an amount of the financial transaction.

Although the current embodiment is described with reference to a financial transaction that involves user #1 and user #2, the approaches described herein may be employed by two or more parties to authorize (and/or agree to) a variety of actions. According to these embodiments, the user selects an identity of the other party(ies), the agreed upon act, and if necessary, any other details, constraints or qualifiers. As will be apparent to those of ordinary skill in the art, the party identification is in the form of something other than a "payee" or "payor" where the action does not involve a payment. Further, regardless of the form of transaction the identification of the parties to the transaction can include the identification of an entity such as a company or other organization rather than an individual. As will also be apparent, where the action/permission to be agreed upon does not include a payment, the respective parties can provide USR with a description concerning the requested action, for example, access to a particular physical space or secure electronic system during a specific time-period and/or for an agreed upon cumulative amount of time.

In the illustrated embodiment, where Device 1 is not in communication with USR, the authentication of user #1 and processing of the payment request is delayed until such time that Device 1 can communicate with USR. Similarly, where Device 2 is not in communication with USR, the authentication of the identity of user #2 and the processing of the payment is deferred until such time that Device 2 is in communication with the USR. Accordingly, the transaction is not completed until each of Device 1 and Device 2 are in communication with USR, subsequent to acts 548 and 550, such that remaining acts included in the process 540 can be completed.

For example, where Device 1 is not in communication with USR at the time user #1 requests the transaction then the non-predictable value associated with user #1 is transmitted to USR along with a payee ID and the dollar amount of the transaction when Device 1 is next in communication with USR. Similarly, at Act 554, where Device 2 is not in communication with USR at the time user #2 requests the transaction then the non-predictable value associated with user #2 is transmitted to USR along with the payer ID and the dollar amount when Device 2 is next in communication with USR. As described with reference to the process 500 of FIG. 6, either or both of the acts 552 and 554 can be preceded by an authentication of USR to the respective mobile devices, for example, as illustrated in acts 586 to 590 of the process 580 in FIG. 10.

At Act 556, USR authenticates the identity of the payer (user #1) using the non-predictable value received from Device 1 while at Act 558 USR authenticates the identity of the payee (user #2) using the non-predictable value communicated from Device 2.

At Act 560, where USR successfully authenticates the identities of both payer and payee, the request is processed. Alternatively, should authentication of at least one of the parties to the transaction fail USR will not complete the transaction but will instead notify the parties that the request cannot be processed, at Act 561. Where the transaction is completed successfully, USR transmits confirmation to the payee and payer at Act 562.

Figure 10:
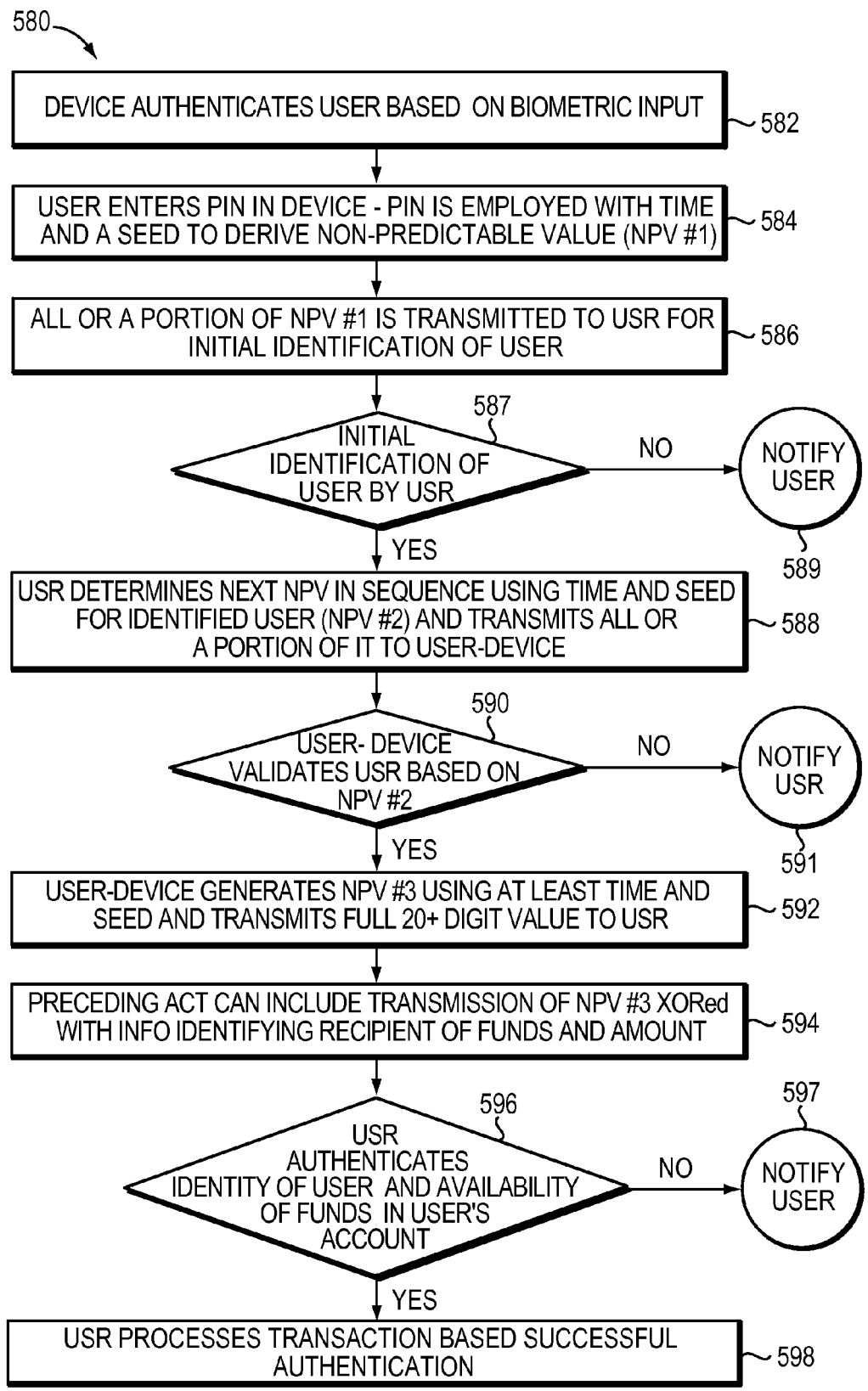
FIG. 10 is a flow chart in accordance with one embodiment.

Referring now to FIG. 10, a process 580 is illustrated including multi-factor security where the factors include each of something the user knows, something the user has, and something the user is. The use of one of the preceding factors more than once in an authentication process (in the same or different form) adds an additional level of security that provides 3+ security. For example, in some embodiments, a first form of biometric is included in the original three factors that are authenticated (for example, voice recognition) and a second form of biometric (for example, an image) must also be authenticated to allow the action (for example, a financial transaction) to proceed. According to some embodiments, the respective factors may be authenticated by the same elements or different elements included in the process. For example, one or more factor can be authenticated for device activation, while the same or different factor(s) are authenticated by USR. In a further embodiment, the same or different factors for the same user or entity are authenticated by a third party, for example, an operator of a POS or a party to a personal payment.

At Act 582, a user's device authenticates the user based on a biometric input. The biometric input can be any of the variety of biometric inputs described herein including voice, fingerprint, handwriting, retinal scan or any other form of biometric that can be sensed and processed by the device. Although illustrated as authentication using a biometric, other forms of device-based user authentication can be used in accordance with various embodiments.

At Act 584, the user enters a PIN in the device. Further, the PIN is employed along with the time and the seed which was previously provided to the device by USR to provide a non-predictable value, NPV #1. As will be recognized, the non-predictable value includes a time-varying value where time is employed in the derivation of the NPV #1. At Act 586, the process continues with all or a portion of NPV #1 being transmitted to USR for an initial identification of the user in possession of the device. According to one embodiment, the non-predictable values generated in the process 580 are 20 digits or more. However, the number of digits (either generated or transmitted) can be adjusted in advance to achieve a desired level of security.

For example, Act 586 can include a transmission of a complete 20+ digit non-predictable value. Alternatively, only a portion of the 20+ digit non-predictable value can be transmitted from the device to USR for an initial identification (that is only a subset of digits generated are submitted). In some embodiments, a generation and/or transmission of a non-predictable value having a smaller size can increase the efficiency and speed at which the process 580 is completed. Then, at Act 587, USR employs the transmitted non-predictable value to determine an identity of the user associated with the device. In various embodiments, one or more of the code matching approaches described herein can be employed at USR in Act 587.

Should the initial identification using NPV #1 fail, the process can also include an Act 589 in which the USR notifies the user that the identification failed. According to some embodiments, the user may get an opportunity to provide another NPV #1 to USR to initially establish their identity.

At Act 588, USR, using the time and the seed associated with the device, determines the next non-predictable value in sequence that would be generated by the device. The USR generates this next-in-sequence non-predictable value (NPV #2) and transmits it to the user device. Here too, can include a transmission of a complete 20+ digit non-predictable value. Alternatively, transmission of the non-predictable value can include all or only a portion of a 20+ digit non-predictable value (again, only a subset of digits generated are transmitted). Considerations here include the desired level of security, the processing power included in the user's device and the associated amount of time required for the device to perform the comparison required to authenticate USR.

Should the validation of the USR fail, the process can also include an Act 591 in which the USR receives notification that the validation at the user device was unsuccessful. According to some embodiments, the USR the same or a different NPV#2 subsequent to Act 591.

At Act 590, the user device validates USR based on NPV #2. For example, user device can employ the seed and the time of the time increment at which NPV#2 was generated to determine the value that is generated by an authentic USR. The user device compares NPV#2 to this value to determine whether the device is in communication with USR rather than an imposter (to detect man-in-the-middle attacks). Provided that USR is successfully authenticated by the device, the process 580 proceeds to Act 592.

At Act 592, the user device generates NPV #3 using at least the time and the seed associated with the device and transmits NPV #3 to USR. In this instance, the full 20+ digit non-predictable value is transmitted in its entirety to provide a high level of security. In addition, as illustrated at Act 594, NPV #3 can be combined with information identifying the recipient of funds involved in the transaction as well as an amount of the transaction before being transmitted. In one example, NPV #3 is XORed with the information regarding the recipient of the funds and the amount. Further, in some embodiments where lower security is acceptable, act 592 includes transmission of fewer than 20 digits to increase the speed of the process 580.

At Act 596, USR authenticates the identity of the user based on the non-predictable value transmitted from the user device (NPV #3). In addition, USR can check for the availability of funds in the user's account.

Should the authentication fail, the process can also include an Act 597 in which the USR notifies the user that the authentication failed. According to some embodiments, the user may get an opportunity to try a subsequent authentication attempt with USR at Act 597.

At Act 598, USR processes the transaction provided that the identity of the user is properly authenticated and that the available funds are sufficient to cover the requested transaction. USR can notify a selected party or party to the transaction should the authentication and/or financial check fail.

According to alternate embodiments, the USR acts as an intermediary to banks, credit card companies or other financial service entities. According to these embodiments, the USR communicates the transaction details to the financial services company. The approval or denial of the transaction is then communicated to the user either directly from the financial services company or via USR, depending on the embodiment.

In addition, in some embodiments, an image of the user can be transmitted to either the user's device (to allow the user to display the image to another party to the transaction) or directly to the device of the other party for display. According to these embodiments, USR defers the processing described at Act 598 until receipt of an acknowledgement by the party who has responsibility for review of the image authenticating the identity of the user.

In this or any other embodiment in which an image of a first party to a transaction request is displayed for review by a second party, the selection of the image that authenticates the identity of the first party can be a pre-requisite to the completion of the transaction. For example, as described herein with reference to Act 518 and 520 of FIG. 6 or Act 486 of FIG. 5. Further where embodiments include such an act at a point-of-sale, a clerk or other staff-member can select the image from among a plurality of images that are displayed at the POS terminal (for example, the POS terminal 676 or the interface device 682 illustrated in FIG. 8). In one approach, each of a plurality of customers has established wireless communication with the POS terminal or interface device and an image of each is displayed to the clerk. The clerk selects the image of the customer who is currently conducting the sales transaction. For example, the clerk can select the image of the user with a touch-screen included for the POS (either a fixed location POS or a portable tablet-type POS).

Further, where the close proximity of multiple individuals/parties requires a selection of a unique party to the transaction from among a plurality of possible parties, a customer can enter a unique POS identifier to either initiate or complete a selected transaction. For example, the user enter the number associated with a particular check out station/line, gas pump, etc. According to some embodiments, a proximity signal is employed to restrict transactions to only those wireless user-devices that are located immediately adjacent to the POS, or the wireless user device of the other party.

According to various embodiments, the non-predictable values employed in the process 580 are random one-time numbers, for example, pseudo random numbers. Further, according to some embodiments, the non-predictable values used to identify the user to USR (for example, at act 586) and to identify the USR to the user (for example, at act 588) are a partial (or subset of digits) from a non-predictable value generated for a previous time period for the user that were not employed for authentication. For example, the NPV #1 and the NPV #2 are previously generated but unused random one-time numbers, or portions thereof. Further, the preceding embodiments can be used where the USR is a "cloud" resource available to the user. According to some embodiments, the USR receives a first portion of NPV#1 from the wireless user-device where the first portion is employed by the USR to identify the wireless user-device to the USR. Prior to authenticating the identity of the user but with a high degree of certainty that it is communicating with an authorized user-device, the USR transmits a second portion of the NPV#1 to the user-device. Thus, the second portion of NPV#1 is employed as NPV#2 in the process 580. Where the second portion matches the value expected (generated as a portion of NPV#1) by the user-device, the user-device has a high degree of certainty that user-device is communicating with the USR rather than an imposter to complete the authentication process (for example, the authentication process 580 beginning at 592).

According to some embodiments, an untransmitted portion of a previously generated non-predictable value may be employed as an exclusive-or (XOR) checksum to insure the integrity and authenticity of the information being transmitted. Similarly, previously generated but unused non-predictable values can be used to encrypt (for example, using an exclusive-or operation) data communicated from either the user-device or the USR.

Further, in various embodiments, the random one-time code (for example, any of NPV#1, NPV#2 and NPV #3) is generated by employing a PIN in combination with any one of or any combination of an electronic serial number of the user-device, a SIM number of the user-device and a seed associated with the device. According to one embodiment, the PIN is stored in the user-device while in an alternate embodiment the PIN is not stored in the user-device.

Figure 11:
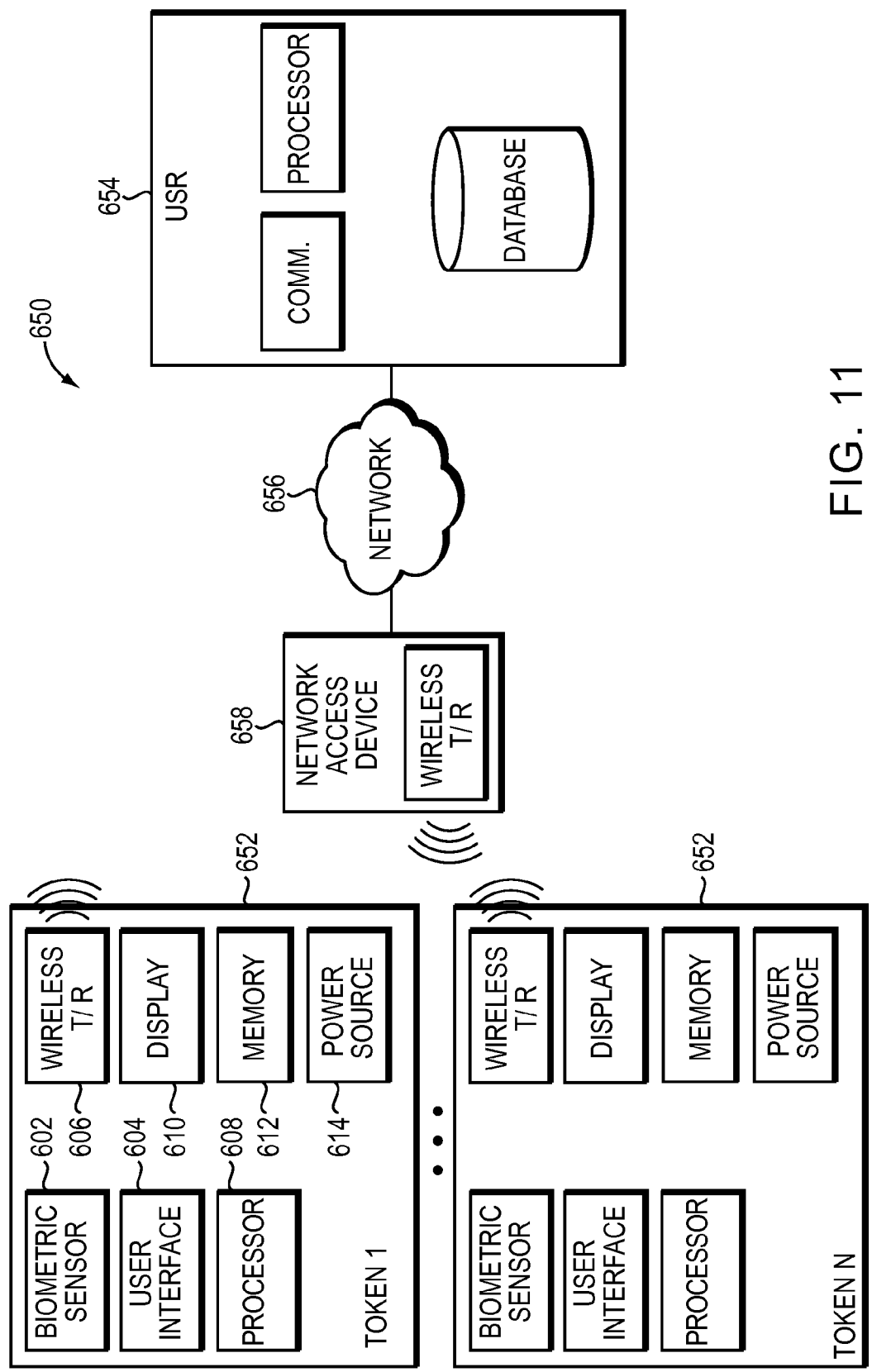
FIG. 11 is a system block diagram in accordance with one embodiment.

Referring now to FIG. 11, a system 650 including a USR 654 and a plurality of wireless user devices 652 (for example, wireless tokens 1-N) is illustrated in accordance with one embodiment. As used herein, the term "token" refers to a device that represents at least one factor employed in authenticating an identity of a user or entity. As should be apparent, in some embodiments, a token can include a mobile user device such as a mobile phone where the token represents something the user has. For example, the token can include a seed that must be employed to generate authentication information that can be successfully processed by the USR 654. In the illustrated embodiment, the system 650 can also include one or more network access devices 658, depending upon the embodiment, and a network 656. In general, the system 650 can be employed by a user in possession of a wireless token such as a smart phone, tablet or other form of wireless electronic device. According to various embodiments, the network 656 provides users with access to the cloud where a variety of remote resources (for example, the USR 654) can be accessed.

In the illustrated embodiment, each of the wireless user devices 652 include a biometric sensor 602, a user interface 604, a wireless transceiver 606, a processor 608, a display 610, a memory 612 and a power source 614. According to one embodiment, the display 610 is included in the user interface 604. In various embodiments, the biometric sensor 602 can detect at least one of a voiceprint, a fingerprint, a signature and a retinal scan. Further, one or more communication busses can be included in the wireless user device 652 to a communication of electronic signals within the user device such as the communication of data and/or instructions. The processor 608 can, for example, control communication within the user device 652. According to some embodiments, the processor is included in a microcontroller.

In some embodiments, the system 650 includes all or some of the features and functionality described with reference to the system 730 illustrated in FIG. 12. For example, the wireless networks and wireless communication protocols employed for communication between the wireless user devices 652 and/or between the user devices and the network access device 658 can include any of those identified with reference to the system 730. As another example, the wireless device 652 can include all or some of the features and functionality described with reference to the wireless user device 735 of the system 730 illustrated in FIG. 12. For example, the wireless user device 652 can include any of the seed 757, the SIM 758 and the ESN 759 illustrated in FIG. 12. Further, in some embodiments, the USR 654 includes all or some of the features and functionality of the USR 734 of the 730 illustrated in FIG. 12.

In various embodiments, the system 650 can also be employed as a peer-to-peer secure identification system. According to one embodiment, biometric information for a pre-defined affinity group (for example: U.S. air marshals; FBI, CIA, Secret Service, Homeland Security or TSA personnel; airline employees, members and/or employees of Congress, the White House, the Pentagon, Fortune 500 companies, private organizations or the armed services) is maintained by the system. The system 650 allows members of the affinity group to challenge and/or identify themselves to one another in a highly secure manner with a high degree of certainty that the authentication information that is presented is legitimate. According to some embodiments, the wireless user-device 652, for example, the wireless user-device 652 of a challenger is stationary rather than a mobile device.

In general, authorized individuals register and establish their secure account at the USR 654 (see, for example, approaches described with reference to FIGS. 1-3, herein). In some embodiments, their digital photograph or other biometric information is obtained and stored in the database included in the USR 654. Other members of the affinity group register similarly and an affinity group manager establishes the members of the group. In one embodiment, the affinity group manager directly manages the membership on the USR server(s). According to another embodiment, the manager contacts the business entity that operates the USR 654 and that organization implements the necessary change(s) in membership status. In some embodiments, a different type of biometric is employed either alone or in combination with the image in an authentication process.

The stored biometrics and/or images are used as described below to authenticate identity. According to these embodiment, each of the user devices 652 stores a first portion (the A portion) of the biometric, respectively, of all members of the affinity group (with the possible exception of themselves). The user device 652 stores a second portion (a B portion) of the biometric of the user associated with the user device 652.

In a further embodiment, when two members of an affinity group meet they employ their respective user devices 652 and stored biometric information to authenticate one another. In one embodiment, a first user wirelessly transmits the B-portion of their biometric to the user device 652 of a second user. The user device 652 of the second user receives the B-portion for the first user and combines it with the previously stored A-portion for the first user to provide the full biometric for the first user. The second user then reviews this "full" biometric of the first user to authenticate the first user. According to one embodiment, the biometric includes an image where the A-portion and the B-portion are different portions of the image, for example, they may be different halves. The "full" biometric of the first user can be displayed in a display included in the user device of the second user. Similarly, in some embodiments, the second user also wirelessly transmits the B-portion of their biometric to the user device 652 of first user. The user device 652 of first user receives the B-portion for second user and combines it with the previously stored A-portion for the second user to provide the full biometric for the second user. The first user then reviews this "full" biometric of the second user to authenticate the second user.

In some embodiments, the biometric is split in half and the first portion and the second portion are halves. However, the biometric need not be split in half. Accordingly, in some embodiments, the percentage of the biometric of other members of the affinity group stored on a user device can be either a higher or lower percentage of the full biometric. Regardless of the split, the combination of the two biometrics need only provide a full biometric in combination with the corresponding portion.

According to some embodiments, the biometric (for example, an image) is divided in a manner that further increases the security of these approaches. For example, an algorithm can be employed at each of the USR 654 and the user devices 652 to divide the stored images for a particular affinity group in a varying and irregular manner. According to one embodiment, the division is latitudinally (horizontally) so that the first and second portions are upper and lower regions of the image, respectively. According to another embodiment, the division is occurs longitudinally (vertically) so that the first and second portions are left and right regions of the image, respectively. Employing such an algorithm, the two portions of the images provide the A and B portions, respectively, as a ratio of the percentage of the image included in portion A to the percentage of the image included in portion B varies.

In some embodiments, the parties in an affinity group can, using their wireless user devices 652 challenge one another when they meet. In one embodiment, a soft key is selected in a user interface of the mobile device 652. The selection of the identity-application on the user device initiates a Bluetooth handshake in which authentication information is communicated from one device to another. In general, the communication serves to establish to each user that the other user appears to be a registered member of the affinity group, and following that, authenticates their identity. In some embodiments, a proprietary protocol is employed by the devices 652. In one embodiment, such a protocol utilizes asymmetric encryption. A high resolution image of the challenged individual and relevant identifying information (for example, identifying who they purport to be) is displayed on the user device of the challenger. The image is a full image including the A-portion and the B-portion of the image which are assembled by the wireless user device 652 of the challenger.

An approach in which the user devices store the various portions of the biometrics is advantageous because the user devices need not be in communication with USR 654 to perform an authentication. According to these embodiments, access to the network 656 or other network for communication with the USR 654 is not required. Thus, the authentication process can be completed in locations where external network access is unavailable such as, for example, underground locations, "black" facilities, in a plane at 30,000 feet of altitude, on land, sea, or space. However, in other embodiments, the A-halves are not stored on the user devices 652 but are instead stored at USR 654. According to this embodiment, USR 654 communicates the A-half of a user on request from a member of the affinity group.

Advantages of these approaches include the fact that the approach is rapid. Simple and convenient to use, provides increased security relative to other approaches, is incorporated in an existing item carried by the great majority of people, does not draw attention to the participants when in use, can be field upgradeable with affinity group additions and deletions in substantially real-time where communication with the USR 654 is available, and cannot be used by a third party if lost or stolen.

Further embodiments can also provide any of: control of secure access to classified computers and/or networks; provide secure access to physical facilities, supplement or replace existing less-secure personal ID approaches such as conventional ID badges, ID documentation, drivers licenses, and passports); replace credit cards, toll payment devices, activate/deactivate security alarm systems at home or office; and provide audit trails via, for example, the use of GPS integrated in the wireless user devices 652.

In addition, the system 650 can include the following features in the wireless user device 652: a duress alarm whereby a user can employ the user device 652 to signal the USR 654 that they are under duress without detection by others (for example, where the user adds a known value (+1) to the PIN at the time of entry); and a self destruct mode in which either or both of hardware or software/stored data of the user device 652 is destroyed or rendered inoperable when tampering or abuse of the device is detected. In some embodiments, "self-destruct" can also be triggered based on a passage of time without receiving and/or being able to communicate a reset signal; based on targeted events; or when a location of the user device 652 is out of a pre-defined geographic area. To further increase security, the user device 652 can cryptographically hash data files when not in use.

In some embodiments, the user is challenged by other than an individual with another wireless user device 652. For example, the preceding approaches can be applied to point-of-sale transactions or an access control point. Also, although the above-described approach describes use of an image as the shared biometric, further approaches can employ any of a fingerprint, a signature, a voiceprint and DNA codes as the shared biometric.

Figure 12:
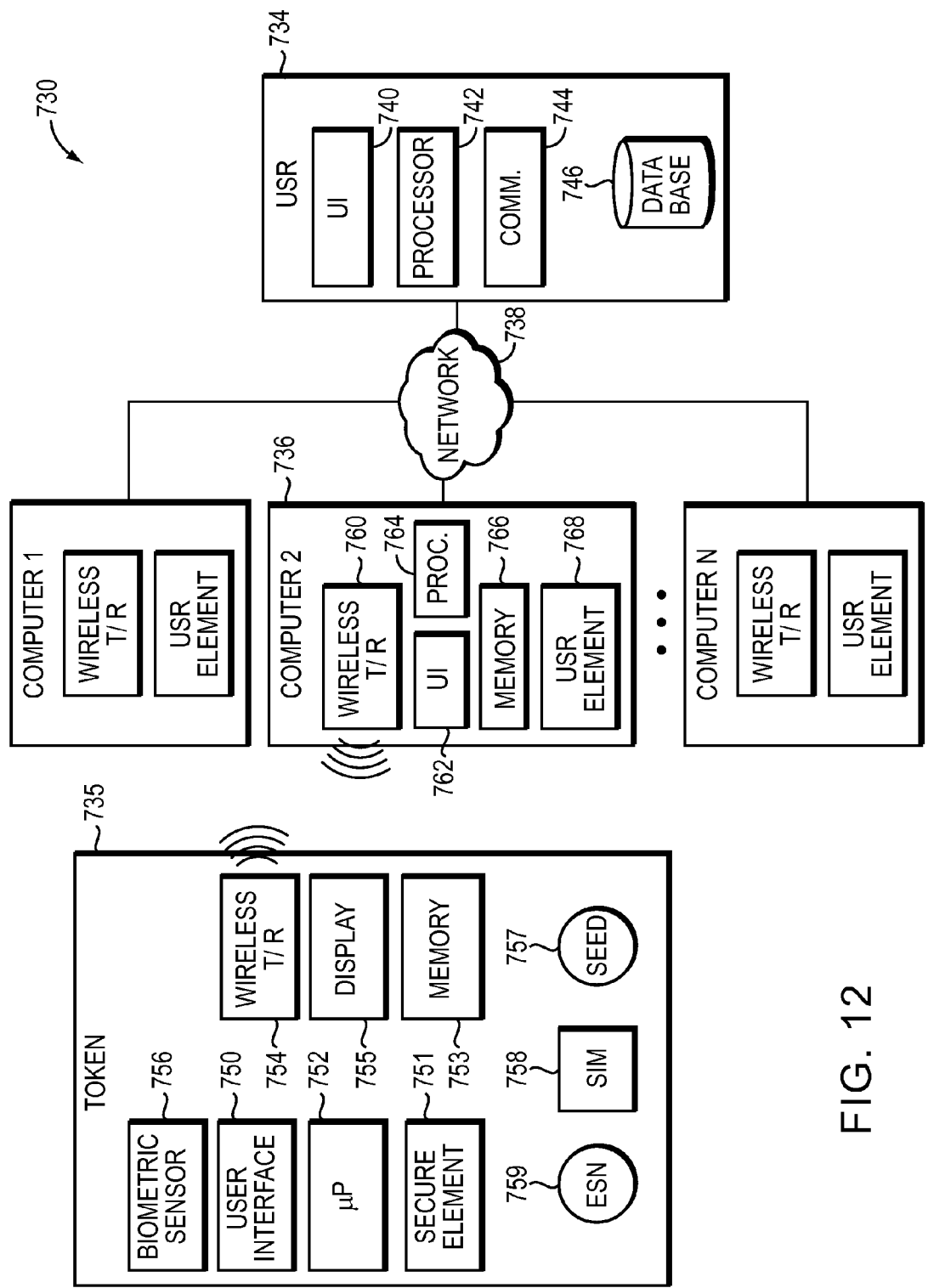
FIG. 12 is a system block diagram in accordance with one embodiment.

Referring now to FIG. 12, a system 730 employing a Universal Secure Registry (USR) is illustrated in accordance with one embodiment. In the illustrated embodiment, the system 730 includes a USR 734, a wireless user device 735, at least one computer 736 and a network 738. In accordance with various embodiments, the wireless user device 735 can include any of a mobile phone, a tablet computer and a personal digital assistant or other type of computing device.

In the illustrated embodiment, the USR 734 includes a user interface 740, a processor 742, a communication interface 744 and a database 746. The USR 734 can also be configured with fewer than all of the preceding elements or additional elements alone or in combination with the preceding. For example, the USR 734 can include any of the elements and/or functionality concerning the USR embodiments described herein. Further, the USR 734 can include one or a plurality of servers co-located or in configurations in which one or more of the servers is geographically remote from others of the servers. According to one embodiment, the USR 734 provides a secure centralized registry that can be employed to facilitate a variety of activities, for example, activities in which authentication of identity is required.

In the illustrated embodiment, the wireless user device 735 includes a user interface 750, a secure element 751, a memory 753, a processor 752, a wireless transceiver 754, a display 755, a biometric sensor 756, a seed 757, a Subscriber Identity Module ("SIM") 758 and an electronic serial number 759.

In accordance with various embodiments, the user interface 750 can include any of a keypad, a camera, a microphone and the display 755. In one embodiment, the user interface includes a touch screen graphical user interface.

In accordance with various embodiments, the memory 753 can include a plurality of memory devices, for example, RAM, ROM, flash memory, SRAM memory or other memory devices. In one embodiment, the processor 752 is included in a microcontroller that includes the processor and memory. Further, the memory can be a discrete memory component, integral to the microcontroller or include both a discrete component and memory included in the microcontroller.

In accordance with some embodiments, the wireless transceiver 754 provides a communication interface in which the wireless user device 735 transmits information including authentication information from the device 735. The wireless user device 735 can also include one or more hardwired communication interfaces. As should be apparent, the wireless transceiver 754 can also be configured to receive information transmitted to the wireless user device 735.

According to some embodiments, the seed 757 is distributed in a manner as described herein concerning the embodiments associated with FIG. 7. In some embodiments, either or both of the seed 757 and the electronic serial number 759 are stored in the memory 753. In further embodiments, the seed 757 and the electronic serial number are stored in a region of the memory 753 that is secured in a manner that makes it more difficult to access by unauthorized parties (which may, for example, include the user). According to some embodiments, the secure element includes an electronic component such as one or a combination of a processor, a microcontroller and a memory. In accordance with some embodiments, the USR seed 757 and/or the electronic serial number 759 are stored in the secure element 751.

In accordance with one embodiment, the computer 736 includes a wireless transceiver 760, a user interface 762, a processor 764, a memory 766 and a USR element 768. Further, the system 730 can include one or a plurality of computers, such as the computers 1-N. For example, a single wireless user device may be employed to access each of the plurality of computers. In one embodiment, the plurality of computers can include an office computer, home computer and any number of computers that can communicate with USR and are secured using the system illustrated in FIG. 12. The computer 736 can include a plurality of computers that are geographically remote from one another. In accordance with various embodiments, the computer can include anyone of a desktop computer, a notebook computer, a laptop computer, a netbook computer and a tablet computer. As will be apparent, other styles and types of computers can be employed in the system 730. In accordance with some embodiments, the computer is a "dumb" terminal that provides access to a network such as a wide area network (the Internet, an intranet or both) that allows an authorized user to access resources (for example, using a web browser) via the computer terminal.

In accordance with various embodiments, the network 738 can include a wide area network, a local area network or a combination of wide area network and a local area network. Further, the network 738 can include wired or wireless networks or combinations of both. Further, according to some embodiment the wireless user device 735 can also communicate over the network 738. In still other embodiments, the wireless user device 735 can communicate with the USR 734 over one or more additional networks that are not employed for communication between the computer 736 and the USR 734.

According to some embodiments, the system 730 is employed as proximity-based computer security system using the wireless user device 735 to generate authentication information to allow a user in possession of the device 735 to unlock the computer 736. According to some embodiments, the wireless user device 735 is employed to provide authentication information wirelessly to the computer when the wireless user device 735 is in proximity of the computer, for example, where proximity is determined by a range of the wireless network. According to these embodiments, the wireless network allows the wireless transceiver 754 of the device 735 to communicate with the wireless transceiver 760 of the computer 736.

In various embodiments the wireless network over which the device 735 and the computer 736 can communicate can include any one of Wi-Fi communication, near field communication (NFC) and Bluetooth communication. For the preceding examples, each type of wireless communication has limited range where Wi-Fi communication has the greatest range, NFC has the most limited range and Bluetooth has a range greater than NFC but less than Wi-Fi. Thus, for each of the preceding types of wireless communication the wireless user device 735 and the computer can remain in wireless communication only so long as the device 735 and the computer 736 are in proximity of one another. In further embodiments, other forms of wireless communication can be employed. Further, where the inherent maximum communication distance is greater than desired, security can be increased by modifying the wireless network hardware or software such that the range is further limited, for example, to a few feet.

According to one embodiment, a user can unlock the computer 736 to access computer resources by successfully authenticating their identity with the USR 734 and then keeping their wireless user device 735 proximate to the computer 736.

In accordance with some embodiments, at least a portion of USR is included in the computer 736. In the illustrated embodiment, the USR element 768 is deployed in the computer 736. The USR element 768 can take various forms depending upon the embodiment. According to one embodiment, the USR element 768 is a software module that performs local authentication of authentication information received from the wireless user device 735. In some embodiments, the USR element 768 includes a combination of hardware and software. Further, where the USR element 768 includes software, the USR element can be electronically-distributed to the computer 736, for example, via the network 738 or via a different network.

In accordance with other embodiments, the USR element 768 only provides an interface between the computer 736 and the USR 734. In accordance with this latter embodiment, communication from the wireless user device 735 is relayed or can be relayed to the USR 734 via the computer 736 using the USR element 768. In still other embodiments, the computer 736 can relay authentication information or other communication from the wireless user device 735 over the network 738 without need for the USR element 768.

In embodiments where USR elements 768 can locally authenticate the user of the wireless user device 735, the USR element can provide it in software such that element 768 can be distributed, for example, securely distributed to a variety of computers 736 that are remote from the USR 734. In accordance with one embodiment, the USR element 768 includes a seed for each user authorized to unlock the computer, respectively. According to this embodiment, the complete authentication of non-predictable values provided by users can be accomplished locally by the computer 736. Thus, in some embodiments, authentication, including bilateral authentication, can be accomplished by the computer 736 without any real-time interaction by the computer with the USR 734. These authentication protocols can include all or some of the acts illustrated in FIGS. 33 and 38, where the protocols are employed to allow access to the computer 736 (for example, rather than authorize a financial transaction). Further, automatic seed updates for both the wireless user device 735 and the computer 736 can occur as described above with reference to FIG. 7. These seed updates can occur with or without knowledge and/or interaction with the user, for example, they may occur randomly.

According to some embodiments, the proximity-based security provided with the wireless user device 735 in combination with the USR 734 is achieved where a USR element is not included in the computer 736.

The overall operation of the system 730 allows the user to operate the computer 736 to access resources using the computer so long as the computer periodically receives authentication information from the wireless user device 735 where that authentication information is successfully authenticated by the USR system either at the USR 734, at the USR element 768, or employing each of the USR 734 and the USR element 768. In some embodiments, a portion of the authentication protocol is performed by each of the USR elements 768 and the USR 734.

Various authentication information can be communicated from the wireless device 735 to the USR to authenticate the user of the device 735 depending on the embodiment. For example, the information transmitted from the wireless user device 735 to the computer 736 can include a time-varying non-predicable value. Multi-factor communication protocols described herein can be employed including protocols in which a time-varying non-predictable value is generated as a result of 2, 3 or 3+ factors.

In some embodiments, the protocol includes the generation of an initial time-varying non-predictable value by the device 734. This value is wirelessly communicated to the computer 736 for authentication with the USR. In one embodiment, the USR element 768 authenticates the user based on the value that is communicated from the device 735. Successful authentication allows the user of the device 735 to unlock the computer to access local or remote resources. The resources can include any of files, images, forms, e-mail, document management systems, catalogs or other information whether located locally on the computer 736 or accessible over a network such as the Internet or an intranet. Thereafter, the device 735 and the computer 736 can periodically communicate where the device 735 communicates subsequent time-varying non-predictable values to the computer for ongoing authentication. According to this embodiment, the computer remains operable to the user (for example, unlocked) so long as the computer continues to receive subsequent authentication values. In accordance with one embodiment, the subsequent authentication values also include a time-varying non-predictable value.

In one embodiment, the initial time-varying non-predictable value used to authenticate the user and unlock the computer includes only a portion of a larger time-varying non-predictable value. In this example, subsequent time-varying non-predictable values can include additional portions of the same time-varying non-predictable value, or a portion of or all of a newly-generated time-varying non-predictable value. In alternate embodiments, a complete time-varying non-predictable value (for example, a 20+ character value with the full set of characters as generated) is employed for the initial authentication and newly-generated time-varying non-predictable values are employed for each of the subsequent authentications, respectively, to maintain the computer 736 in an unlocked state. Depending upon the embodiment, these subsequent authentications can employ a time-varying non-predictable value including a 20+ character value with the full set of characters as generated or a time-varying non-predictable value that includes a subset of the full set of characters. According to some embodiments, the time-varying non-predictable value only includes numeric characters and the subset is a subset of digits. According to other embodiments, the time-varying non-predictable value includes both alpha and numeric characters (for example, a value represented in hexadecimal notation).

In one embodiment, static identifying information is not included and the system 730 employs an identification process as described elsewhere herein. In accordance with an alternate embodiment, at least some form of static identifying information concerning the user is communicated with the non-predictable value in a verification process that is employed either locally at the computer 736, with the USR element 768, or remotely at the USR 734 to authenticate the user.

As mentioned above, the system 730 can maintain the computer 736 in the unlocked state so long as time-varying non-predictable values are received subsequent to the initial authentication, and provided that these later received values are successfully authenticated. Thus, where the user moves with the wireless user device out of the proximity of the computer (for example, out of wireless range) the computer 736 can go into a locked state that will prevent its further use until an authentication protocol is successfully initiated by the same or a different user.

In some embodiments, the system 730 employs an initial user authentication process such as the process 580 described in association with embodiments of FIG. 10, for example, a "handshake" or bilateral authentication must be completed at a start of the process to unlock the computer. However, in one embodiment, the computer can temporarily lock-up for a permissible time period following the initial successful user authentication. Provided that the user returns within the permissible time-period, the computer will unlock (provided that a subsequent time-varying non-predictable values is received and successfully authenticated) without need for the user to repeat the initial user authentication process.

In this example, the computer 736 is unlocked with an initial authentication and remains in the unlocked state so long as the subsequent time-varying non-predictable values is received and successfully authenticated. Where a subsequent time-varying non-predictable value is received and not successfully authenticated, the computer 736 will return to a locked state that requires a user to complete the initial user authentication process to unlock the computer 734. However, where the computer stops receiving subsequent time-varying non-predictable values for less than a predetermined period of time (for example, a matter of minutes when the user has momentarily left the immediate vicinity of the computer) that user can return and unlock the computer with the successful authentication of subsequent time-varying non-predictable values generated with the wireless user device without beginning the authentication process anew.

The computer 736 can be configured to authenticate one or more users to employ one or more wireless user devices 735. For example, computer 736 can be accessible to a plurality of users where each of the users employs a different wireless device 735, respectively. According to these embodiments, the computer can maintain (or access via USR 734) authentication information such as seeds for each of the plurality of authorized users. Further, each of the plurality of wireless user devices generates time-varying non-predictable values independently of others of the plurality of wireless user devices.

Further, activation of the wireless user device 735 can employ approaches described herein using multiple factors including something the user knows, something the user has, something the user is alone or in combination with each other or with additional factors. Thus, in accordance with one embodiment the wireless user device 735 includes a seed that is used to generate a time-varying non-predictable value. In accordance with some embodiments, the seed 757 is provided by the USR 734 in the manner described else where herein. In accordance with a further embodiment, the electronic serial number of the wireless user device 735 can also be employed as a seed either alone or in combination with the USR seed 757. Similarly, the subscriber identity module can include information that is employed alone or in combination with the USR seed 757 and/or the electronic serial number 759 as a seed that is used to generate a time-varying non-predictable value. As should be apparent, the approach then employs the seed to generate the time-varying non-predictable value and also employs a temporal element such as the current time, for example, a time at which the code or the value is generated. According to some embodiments, the processor of the wireless user device 735 is configured to employ time, secret information known to the user and a seed to generate the time-varying non-predictable value. In accordance with further embodiments the processor is configured to generate the non-predicable value at least in part by combining the secret information and the seed and in an exclusive-or operation. Either or both of the electronic serial number 759 and the SIM number 758 may be employed in any combination with the preceding to further increase security of the multi-factor authentication process.

According to some embodiments, the subsequent time-varying non-predictable values are generated for subsequent time periods, respectively. The selection of the increment of time that provides the subsequent time periods can be selected based on the embodiment such that a new period of time occurs with a relatively high frequency in high security applications or at a lower frequency for lower security applications. Accordingly, depending upon the embodiment, the subsequent time-varying non-predictable value used in an authentication process can refer to a time-varying non-predictable value that is generated for a time period that is immediately subsequent to the preceding time-period or a later occurring time-period. For example, the NPV #1, the NPV #2 and the NPV #3 can be generated for three consecutive time periods or in sequence for time periods that include one or more time periods for which a NPV is not generated and transmitted. The approach can vary depending upon a length established for the time periods and the time required for a transmission and/or processing of the time-varying non-predictable value. In one embodiment, the USR system operates to vary the length of the time periods to increase security.

The preceding embodiments can be employed to provide an uncounterfeitable token that may be used in processes that have increased security relative to prior approaches.

According to some embodiments, an electronic wallet included in a mobile phone allows one to use any number of credit or debit cards at the point-of-sale where no private, sensitive, or secret information or account numbers are stored in the device or transmitted by near field communication ("NFC"). In further embodiments, the electronic wallet, in addition to NFC, can also communicate in Bluetooth and Wi-Fi and can be used for interpersonal funds transfer, computer network access, access to physical facilities and to otherwise authenticate one's identity and act as an individual's trusted agent.

In some embodiments, a user must satisfy 3 factor security to make a transaction, for example, by using a discreet token (the mobile phone), a secret (the users PIN), and a voice print (a biometric). In these embodiments, the biometric can not be recorded and replayed because the biometric required for authentication and/or device activation is a new code that must be spoken digit-by-digit with each authentication. In embodiments where a digital picture of the identified user is sent to POS from USR the requirements of; 3+ Factor Security™ are met.

Embodiments of the system and method described herein can employ identification technology to increase security because no static abusable or exploitable static identifier is used. The preceding feature distinguishes these embodiments from verification technology where some form of static identifier is required. Further, where static identifying information is not employed, the generated, successful, unpredictable code transmitted from the mobile user device represents satisfaction of all three security factors and identifies, rather than verifies, the identification of the user.

Further, the various embodiments described herein can be employed in an identification process or a verification process depending on the specific embodiment. For example, in one approach (identification) static identifying information that identifies the user is not included with the transmitted random one-time code. Because an identification process provides increased security, in this embodiment, the USR employs a code matching algorithm to authenticate the user's identity without benefit of any static identifying information. In contrast, in another approach for the embodiments described herein the USR employs the static identifying information in combination with a code matching algorithm to authenticate the user's identity.

In some embodiments, no PIN is stored in the token. In some of these embodiments, the PIN is integrated with the algorithm and never stored, transmitted, or exposed.

In the improbable circumstance where at a particular time period more than one unpredictable code is generated for more than one user at USR, USR can in some embodiments wait for the next (immediately subsequent in time) code to authenticate based on a user's unique identity.

Further, in some embodiments, a "token" can first send a non-transactional subset non-predictable code to the USR server. The server then sends a subset of the next code that the USR token would generate to the token. Thus, the server has demonstrated its authenticity to the token and then the token can send the actual, active, non-predictable code to the now trusted, authenticated secure USR server.

Still further, in various embodiments, some of the preceding can employ, or be employed in, apparatus, systems and methods where a verification process in used. For example, the non-predictable value can be communicated along with static identifying information. Where even greater security is required an identification process can be employed. For example, with the identification process, the non-predictable value can be communicated without any static identifying information.

According to any of the preceding embodiments, the mobile devices each include a GPS. According to these embodiments, the GPS capabilities can be used to track user activities and apply security criteria that can act to limit transaction activity based on the location of the mobile device and/or the relative change in position of the mobile device.

According to each of the preceding embodiments in which a PIN is employed to generate a non-predictable value communicated for authentication, the PIN need not be stored in the wireless user-device. According to these embodiments, the PIN can be supplied by the user and immediately employed in an algorithm used to generate the non-predictable value (for example, a time-varying non-predictable value).

It should also be appreciated that any of the apparatus, systems and methods described herein can be used with, or in the manner described in U.S. Pat. Nos. 7,237,117; 7,809,651; 7,805,372; 8,001,055; and U.S. patent application Ser. No. 12/393,586 each of which is herein incorporated by reference in its entirety for all purposes. For example, in various embodiments, the systems 650 and 730 disclosed herein can operate in the manner of any one of the systems described in the previously-identified U.S. patents and application and provide any of the functionality of the systems described therein. Similarly, in various embodiments, the USRs 10, 640, 654 and 734 disclosed herein can operate in the manner of any one of the secure registries described in the previously-identified U.S. patents and applications and provide the functionality of any of the secure registries described therein. Further, the wireless user devices and/or tokens 674, 652 and 734 can take the form of any one of the user devices and/or tokens that are described in the previously-identified U.S. patents and applications and provide the functionality of any of the user devices and/or tokens described therein.

As used herein, the terms "wireless device" and "wireless user device" describe apparatus that can wirelessly communicate. These terms encompass devices that can include both wireless communication and wired communication depending upon the manner in which the apparatus is used. For example, as used herein, a "wireless device" can include a USB or other hardwired communication port for temporary or permanent connection to another device and/or network. As will be apparent, a "wireless device" can also include a port for connection to a power source for operating power and/or battery recharging. Further, the embodiments of the wireless user devices described herein can each include a clock (such as an oscillator) used as a time-reference. In some embodiments, the clock is a discrete element while in other embodiments the clock can be included in another element, for example, a microcontroller of the wireless user device. Wireless user devices can also include any of electronic ID devices, mobile phones, PDAs, personal computers, fobs, wristwatches, passports, pens, credit cards and dongles as some examples.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for controlling access to at least one computer, the system comprising:
   a network having at least a portion that includes wireless communication;
   at least one computer coupled to the network;
   a handheld device configured to communicate with the at least one computer over the network, the handheld device including:
      a user interface programmed to receive a user input including first secret information known to a user of the handheld device to authenticate the user to the handheld device, and input of second secret information to authorize the user to use the at least one computer;
      a processor coupled to the user interface, the processor programmed to authenticate the user of the handheld device and to generate a first time-varying non-predictable value following a successful authentication, by the handheld device, of the secret information received via the user interface, wherein generating the first time-varying non-predictable value includes combining at least a portion of the second secret information and a time varying value; and
      a wireless transceiver coupled to the processor and configured to transmit a wireless signal including the first time-varying non-predictable value; and
   a secure registry system including a communication interface coupled to the network, the secure registry system configured to receive the first time-varying non-predictable value and successfully authenticate the user where the first time-varying non-predictable value is matched to the user by the secure registry system, wherein the user of the handheld device is authorized to operate the at least one computer to access resources with the at least one computer so long as the at least one computer periodically receives subsequent authentication information from the handheld device that results in a continued successful authentication of the user for time periods subsequent to a time at which the first time-varying non-predictable value is generated.

2. The system of claim 1, wherein the secure registry system is configured to lock the computer to prevent the user from operating the computer to access resources when the computer fails to periodically receive the subsequent authentication information.

3. The system of claim 2, wherein the secure registry system is configured to lock the computer to prevent the user from operating the computer to access resources when the computer fails to periodically receive the subsequent authentication information because the handheld device is no longer within proximity of the computer.

4. The system of claim 3, wherein the network includes any one of a Wi-fi communication, near field communication and Bluetooth communication employed for communication between the computer and the handheld device, and
wherein the proximity is determined by a range of the network local to the computer.

5. The system of claim 4, wherein the handheld device includes any of a mobile phone, smart phone, a tablet computer and a personal digital assistant, and
wherein the computer includes any one of a desktop computer, a notebook computer, a laptop computer, a netbook computer and a tablet computer.

6. The system of claim 3, wherein the secure registry system is coupled to a plurality of computers, the computers each associated with a plurality of users, respectively, and
wherein the secure registry system is configured to authenticate each of the plurality of users to provide access for each user to at least one computer associated with the user, respectively.

7. The system of claim 6, wherein the plurality of users includes a second user associated with a second computer,
wherein the second user is in possession of a second handheld device including a second processor, and
wherein the processor is configured to generate a second time-varying non-predictable value following a successful authentication of the second user by the second device.

8. The system of claim 7, wherein the second handheld device includes a second wireless transceiver coupled to the second processor and configured to transmit via a second network a second wireless signal including the second time-varying value,
wherein the communication interface of the secure registry is configured to receive the second time-varying non-predictable value and successfully authenticate the second user where the second time-varying non-predictable value is matched to the second user by the secure registry system, and
wherein the second user is permitted to operate the second computer to access resources so long as subsequent authentication information from the second handheld device of the second user results in a continued successful authentication of the second user for time periods subsequent to a time at which the second time-varying non-predictable value is generated.

9. The system of claim 8, wherein the secure registry system is configured to lock the first computer to prevent access to resources using the first computer when the first computer fails to periodically receive authentication information subsequent to the time at which the first time-varying non-predictable value is generated because the first handheld device is no longer within proximity of the first computer, and
wherein the secure registry system is configured to lock the second computer to prevent access to resources using the second computer when the second computer fails to periodically receive authentication information subsequent to the time at which the second time-varying non-predictable value is generated because the second handheld device is no longer within proximity of the second computer.

10. The system of claim 1, wherein the secure registry system is located remote from the computer, and
wherein the authentication of the first time-varying non-predictable value and any subsequent time-varying non-predictable values occur at the secure registry system.

11. The system of claim 1, wherein at least a portion of the secure registry system is located at the computer, and
wherein the authentication of the first time-varying non-predictable value and any subsequent time-varying non-predictable values occur at the computer.

12. The system of claim 1, wherein the handheld device includes a memory coupled to the processor, the memory configured to store a seed employed by the processor to generate the first time-varying non-predictable value; and
wherein the processor is configured to employ time, the at least a portion of the second secret information and the seed to generate the first time-varying non-predictable value.

13. The system of claim 12, wherein the secure registry is configured to distribute seed-updates to the handheld device via the network without requiring any interaction on the part of the user, and
wherein the seed-updates are communicated at random intervals to provide a new seed value to the handheld device.

14. The system of claim 13, wherein at least a portion of the secure registry system is located in a computer, the computer proximate to the handheld device when the wireless signal is transmitted,
wherein the computer includes a memory configured to store the seed, and
wherein the seed is employed by the computer to authenticate the user.

15. The system of claim 14, wherein the processor is configured to combine the at least a portion of the second secret information with the seed to generate the first time-varying non-predictable value.

16. The system of claim 15, wherein the processor is configured to generate the first time-varying non-predictable value, at least in part, by combining the at least a portion of the second secret information and the seed in an exclusive-or operation, and
wherein the secret information is not stored in the handheld device.

17. The system of claim 14, wherein the memory is configured to store at least one of an electronic serial number, a unique code, and a SIM code, and
wherein the processor is configured to generate the first time-varying non-predictable value, at least in part, by combining the seed with at least one of the electronic serial number, the unique code, and the SIM code in an exclusive-or operation.

18. The system of claim 17, wherein the second secret information is not stored in the handheld device.

19. The system of claim 17, wherein the handheld device includes a secure element, and
wherein the secure element is configured to store at least one of the seed and the electronic serial number.

20. The system of claim 14, wherein the handheld device includes a biometric sensor comprising a microphone configured to receive a spoken input provided by the user,
wherein the user interface is programmed to display a multi-character string including at least one of a plurality of alpha-characters and a plurality of numeric-characters, and
wherein the processor is programmed to authenticate the user based on the spoken input of the multi-character string by the user.

21. The system of claim 20, wherein the secure registry system is programmed to randomly generate the multi-character string and communicate the multi-character string via the network to the handheld device for display,
wherein at least a portion of the secure registry system is located in the at least one computer, and
wherein the at least the portion of the secure registry located in the at least one computer configured to generate the multi-character string.

22. The system of claim 11, wherein the secure registry system includes a database configured to store the seed,
wherein, following a successful authentication of the user, the secure registry system is configured to generate a second time-varying non-predictable value using time, the at least a portion of the second secret information and the seed,
wherein the communication interface is configured to transmit the second time-varying non-predictable value to the handheld device via the network, and
wherein the processor is configured to authenticate the secure registry system using the second time-varying non-predictable value.

23. The system of claim 22, wherein the processor is configured to, following a successful authentication of the secure registry system, generate a third time-varying non-predictable value,
wherein the wireless signal is a first wireless signal,
wherein the wireless transceiver is configured to transmit via the network a second wireless signal including the third time-varying non-predictable value, and
wherein the secure registry system is configured to authenticate the user using the third time-varying non-predictable signal.

24. A method of securing a computing device, the method comprising:
receiving, at the computing device, a first wireless signal including first authentication information wirelessly transmitted from a mobile device proximate to the computing device, wherein the first authentication information includes a first time-varying non-predictable value combined from at least a portion of secret information known to a user and a time varying value;
processing the first authentication information to initially authenticate a user in possession of the mobile device, the user attempting to access resources with the computing device;
temporarily allowing the user to employ the computing device to access the resources when the initial authentication is successful;
continuing to allow the user to employ the computing device to access the resources upon a subsequent receipt of authentication information from the mobile device that is successfully authenticated; and
automatically terminating use of the computing device by the user based on at least one of authentication information no longer being received from the mobile device and authentication information received from the mobile device no longer being successfully authenticated.

25. The method of securing a computing device of claim 24, further comprising:
receiving, at the computing device, subsequent wireless signals from the first wireless device on a periodic basis, the periodic basis including a predetermined period during which the computing device must receive authentication information;
continuing to allow the user to employ the computing device to access the resources where the subsequent wireless signals include authentication information that is successfully authenticated; and
terminating use of the computing device when at least one of the subsequent wireless signals is not received during a respective predetermined period.

26. The method of claim 24, further comprising:
including in the authentication information included in each of the subsequent wireless signals a respective time-varying non-predictable value generated by the mobile device.

27. The method of claim 26, further comprising initially authenticating the user of the mobile device when the first time-varying non-predictable value is matched to the user by a secure registry system geographically remote from the computing device.

28. The method of claim 27, further comprising subsequently authenticating the user of the mobile device at each occurrence where the respective time-varying non-predictable value is matched to the user by the secure registry.

29. The method of claim 27, further comprising:
including at least a portion of the secure registry system in the computing device; and
locally authenticating the user with the computing device.

30. The method of claim 29, further comprising:
including public identifying information of the user in the authentication information; and
authenticating the user by comparing the time-varying non-predictable value received in the wireless signal with verification information for the user based on an identity provided by the public identifying information.

31. The method of claim 24, further comprising:
locating at least a portion of a secure registry system remote from the computing device;
communicating a first time-varying non-predictable value to the remote portion of the secure registry system for an initial authentication; and
locally authenticating the respective time-varying non-predictable values with the computing device.

32. The method of claim 25, further comprising maintaining an ability for the mobile device to wirelessly communicate with the computing device in response to determining that the mobile device is located within a pre-determined distance of the computing device.

33. The method of claim 24, wherein the mobile device includes any of a personal digital assistant, mobile phone and a tablet computer, and
wherein the method further comprises communicating the wireless signal by one of Bluetooth, near field communication and Wi-Fi.

34. The system according to claim 1, wherein the handheld device is configured to initiate a one-way communication signal to deliver the wireless signal.

35. The system according to claim 34, wherein the handheld device is configured to initiate one-way communication of the subsequent authentication information.

36. The system of claim 1, wherein the network is a short range wireless network and wherein the secure registry system is stored on the at least one computer.

37. A secure system for controlling access to at least one computer, the secure system comprising:
- at least one computer configured to receive a short range wireless signal;
- a handheld device configured to communicate with the at least one computer via the short range wireless signal, the handheld device including:
  - a user interface programmed to receive a user input including secret information known to a user of the handheld device to authorize the user to use the at least one computer;
  - a processor coupled to the user interface, the processor programmed to authenticate the user of the handheld device and to generate a first time-varying non-predictable value following a successful authentication, by the handheld device, of the secret information received via the user interface, wherein the generating the first time-varying non-predictable value includes combining at least a portion of the secret information and a time varying value; and
  - a wireless transceiver coupled to the processor and configured to transmit the short range wireless signal including the first time-varying non-predictable value; and
- a secure registry component configured to receive the first time-varying non-predictable value from the short range wireless signal and that is configured to successfully authenticate the user where the first time-varying non-predictable value is matched to the user by the secure registry;
- wherein the user of the handheld device is authorized to operate the at least one computer to access resources with the at least one computer so long as the at least one computer periodically receives subsequent authentication information from the handheld device that results in a continued successful authentication of the user for time periods subsequent to a time at which the first time-varying non-predictable value is generated.

38. The system of claim 37, wherein the secure system is configured to lock the at least one computer to prevent the user from operating the at least one computer to access resources when the at least one computer fails to periodically receive the subsequent authentication information.

39. The system of claim 37, wherein the wireless signal includes any one of a near field communication and Bluetooth communication employed for communication between the at least one computer and the handheld device.

40. The system of claim 37, wherein the handheld device includes a memory coupled to the processor, the memory configured to store a seed employed by the processor to generate the first time-varying non-predictable value; and
- wherein the processor is configured to employ time, the secret information and the seed to generate the first time-varying non-predictable value.

41. The system of claim 37, wherein the secure registry component is configured to distribute seed-updates to the handheld device via the wireless signal without requiring any interaction on the part of the user, and wherein the seed-updates are communicated at random intervals to provide a new seed value to the handheld device.

42. The system of claim 37, wherein the at least one computer includes a memory configured to store the seed, and wherein the seed is employed by the at least one computer to authenticate the user.

43. The system of claim 42, wherein the processor is configured to combine the secret information with the seed to generate the first time-varying non-predictable value.

44. The system of claim 43, wherein the processor is configured to generate the first time-varying non-predictable value, at least in part, by combining the secret information and the seed in an exclusive-or operation, and wherein the secret information is not stored in the handheld device.

45. The system of claim 37, wherein the handheld device includes a memory coupled to the processor, the memory configured to store a seed, at least one of an electronic serial number, a unique code, and a SIM code, and wherein the processor is configured to generate the first time-varying non-predictable value, at least in part, by combining the seed with at least one of the electronic serial number, the unique code and the SIM code in an exclusive-or operation.

46. The system of claim 37, wherein the at least one computer is configured to forward the first time-varying non-predictable value to another computer system.

* * * * *